(12) United States Patent
Guan et al.

(10) Patent No.: US 12,531,672 B2
(45) Date of Patent: *Jan. 20, 2026

(54) REPEATED TRANSMISSION METHOD AND COMMUNICATIONS APPARATUS

(71) Applicant: HUAWEI TECHNOLOGIES CO., LTD., Guangdong (CN)

(72) Inventors: Peng Guan, Shenzhen (CN); Xi Zhang, Chengdu (CN); Lei Chen, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,195

(22) Filed: Mar. 19, 2024

(65) Prior Publication Data

US 2024/0223316 A1 Jul. 4, 2024

Related U.S. Application Data

(63) Continuation of application No. 17/121,053, filed on Dec. 14, 2020, now Pat. No. 11,949,517, which is a (Continued)

(30) Foreign Application Priority Data

Jun. 15, 2018 (CN) .......................... 201810621605.0

(51) Int. Cl.
*H04L 1/00* (2006.01)
*H04B 7/0417* (2017.01)
(Continued)

(52) U.S. Cl.
CPC .......... *H04L 1/189* (2013.01); *H04B 7/0417* (2013.01); *H04L 1/1657* (2013.01); *H04L 1/1819* (2013.01); *H04L 1/1858* (2013.01)

(58) Field of Classification Search
None
See application file for complete search history.

(56) References Cited

U.S. PATENT DOCUMENTS 10,231,208 B2 * 3/2019 Agiwal ............... H04W 68/025
2015/0003429 A1 1/2015 Terry et al.
(Continued)

FOREIGN PATENT DOCUMENTS

CN 103782636 A 5/2014
CN 106804043 A 6/2017
(Continued)

OTHER PUBLICATIONS

3GPP TS 38.212 V15.1.1, "3rd Generation Partnership Project; Technical Specification Group Radio Access Network; NR; Multiplexing and channel coding (Release 15)," Apr. 2018, 94 pages.
(Continued)

*Primary Examiner* — Mujtaba M Chaudry
(74) *Attorney, Agent, or Firm* — Fish & Richardson P.C.

(57) ABSTRACT

This disclosure provides methods and apparatuses for repeated transmissions in wireless communications. One example method includes: receiving downlink control information (DCI) indicating two transmission configuration indicator (TCI) states, wherein the two TCI states include a first TCI state and a second TCI state, and receiving at least four transmissions of a transport block (TB) by using the two TCI states based on a rule.

20 Claims, 5 Drawing Sheets

Related U.S. Application Data continuation of application No. PCT/CN2019/091239, filed on Jun. 14, 2019.

(51) Int. Cl.
*H04L 1/1607* (2023.01)
*H04L 1/1812* (2023.01)
*H04L 1/1829* (2023.01)
*H04L 1/1867* (2023.01)

(56) References Cited

U.S. PATENT DOCUMENTS

| | | | | |
|---|---|---|---|---|
| 2015/0043439 | A1* | 2/2015 | Sajadieh | H04L 5/0053 370/329 |
| 2016/0105817 | A1* | 4/2016 | Frenne | H04L 1/0026 370/252 |
| 2016/0183143 | A1* | 6/2016 | Park | H04W 16/08 455/436 |
| 2018/0309496 | A1* | 10/2018 | Lee | H04L 5/0053 |
| 2019/0132778 | A1* | 5/2019 | Park | H04W 16/28 |
| 2020/0305168 | A1* | 9/2020 | Liou | H04L 5/0098 |
| 2021/0352665 | A1* | 11/2021 | Kang | H04L 1/08 |
| 2021/0352706 | A1* | 11/2021 | Kang | H04L 5/0044 |
| 2021/0385668 | A1* | 12/2021 | Kang | H04W 72/046 |
| 2021/0400649 | A1* | 12/2021 | Kang | H04B 7/088 |

FOREIGN PATENT DOCUMENTS

| | | |
|---|---|---|
| CN | 107360625 A | 11/2017 |
| CN | 107666682 A | 2/2018 |
| CN | 108023722 A | 5/2018 |
| CN | 108282270 A | 7/2018 |
| WO | 2017083514 A1 | 5/2017 |

OTHER PUBLICATIONS

3GPP TS 38.213 V15.1.0 (Mar. 2018), "3rd Generation Partnership Project;Technical Specification Group Radio Access Network;NR;Physical layer procedures for control(Release 15)," Mar. 2018, 77 pages.

3GPP TS 38.214 V15.1.0 (Mar. 2018), "3rd Generation Partnership Project;Technical Specification Group Radio Access Network;NR;Physical layer procedures for data (Release 15)," Mar. 2018, 77 pages.

3GPP TS 38.321 V15.1.0 (Mar. 2018), "3rd Generation Partnership Project;Technical Specification Group Radio Access Network;NR;Medium Access Control (MAC) protocol specification(Release 15)," Mar. 2018, 67 pages.

3GPP TS 38.331 V15.1.0 (Mar. 2018), "3rd Generation Partnership Project;Technical Specification Group Radio Access Network; NR;Radio Resource Control (RRC) protocol specification(Release 15)," Mar. 2018, 268 pages.

Extended European Search Report issued in European Application No. 19820332.5 on May 31, 2021, 9 pages.

Office Action issued in Chinese Application No. 201810621605.0 on May 6, 2021, 17 pages (with English translation).

PCT International Search Report and Written Opinion issued in PCT/CN2019/091239 on Jul. 31, 2019, 17 pages (with English translation).

\* cited by examiner

REPEATED TRANSMISSION METHOD AND COMMUNICATIONS APPARATUS

CROSS-REFERENCE TO RELATED APPLICATIONS

This application is a continuation of U.S. patent application Ser. No. 17/121,053, filed on Dec. 14, 2020, which is a continuation of International Application No. PCT/CN2019/091239, filed on Jun. 14, 2019, which claims priority to Chinese Patent Application No. 201810621605.0, filed on Jun. 15, 2018. All of the afore-mentioned patent applications are hereby incorporated by reference in their entireties.

TECHNICAL FIELD

This application relates to the communications field, and more specifically, to a repeated transmission method and a communications apparatus.

BACKGROUND

Beam-based communication can bring a higher antenna gain. Especially in a high-frequency communication environment, beam-based communication can overcome fast attenuation of a high-frequency signal. In high-frequency communication, to enhance coverage, for a terminal device with relatively poor signal quality, for example, a terminal device at a cell edge, a network device may perform downlink transmission through aggregation transmission. To be specific, the network device repeatedly sends a transport block (TB) for a plurality of times. For example, the network device repeatedly sends a same signal at same time-frequency resource locations in a plurality of slots. The terminal device may combine a plurality of received signals and decode the TB. This can improve a received signal-to-noise indicator. Similarly, the network device may also schedule the terminal device to perform uplink transmission through aggregation transmission.

In the prior art, in the aggregation transmission, a same beam is used in a plurality of slots. Consequently, communication may fail due to a cause such as beam blocking. Therefore, a new communication method is urgently required, to reduce a failure rate of beam-based communication.

SUMMARY

This application provides a repeated transmission method, to improve a beam communication success rate and enhance communication robustness.

According to a first aspect, a repeated transmission method is provided. The method includes: A first communications apparatus determines a receive beam that is of the first communications apparatus and corresponds to each of K transmissions of a same transport block. The first communications apparatus receives the transport block based on the receive beam that is of the first communications apparatus and corresponds to each transmission. K is an integer greater than 1, the receive beams that are of the first communications apparatus and correspond to the K transmissions are in a one-to-one correspondence with transmit beams that are of a second communications apparatus and correspond to the K transmissions, and transmit beams that are of the second communications apparatus and correspond to at least two of the K transmissions are different.

In the prior art, a same transmit beam is used for a plurality of transmissions of the same transport block. Consequently, communication may fail due to a cause such as beam blocking. According to the repeated transmission method in this embodiment of this application, different transmit beams are used in at least two of a plurality of transmissions, so that a probability of beam blocking can be reduced, thereby improving a communication success rate.

In this application, "receive beam" may also be replaced with "receive parameter", "spatial receive filter", "uplink reference signal port", and the like, and "transmit beam" may also be replaced with "reference signal resource", "spatial transmit filter", "downlink reference signal port", and the like. For a specific concept of a beam, refer to descriptions in the following specific implementations. Details are not described herein.

It should be understood that the repeated transmission method provided in this application may be applied to downlink communication (scenario 1), and may also be applied to uplink communication (scenario 2). When the method in this application is applied to downlink communication, the first communications apparatus is a terminal device, and the second communications apparatus is a network device. When the method in this application is applied to uplink communication, the first communications apparatus is a network device, and the second communications apparatus is a terminal device. It should be further understood that K may also be referred to as an aggregation factor, and the repeated transmission method in this application may also be referred to as a slot aggregation method or a transmission time interval (TTI) bundling method.

Scenario 1

The transmit beams that are of the network device and correspond to the K transmissions are not completely the same. The receive beams that are of the terminal device and correspond to the K transmissions are in the one-to-one correspondence with the transmit beams that are of the network device and correspond to the K transmissions. To be specific, in an $N^{th}$ (where N is any value in 1, 2, . . . , and K) transmission, a transmit beam used by the network device corresponds to a receive beam used by the terminal device. In other words, when the network device uses a transmit beam for sending, the terminal device uses a receive beam corresponding to the transmit beam for receiving. However, it should be understood that one receive beam of the terminal device may uniquely correspond to one transmit beam of the network device, or one receive beam of the terminal device may correspond to a plurality of transmit beams of the network device.

According to the repeated transmission method in this embodiment of this application, in downlink communication, the network device uses different transmit beams in at least two of a plurality of transmissions, so that a probability of beam blocking can be reduced, thereby improving a downlink communication success rate.

It should be noted that the "transport block" in downlink transmission is essentially an information bit stream needing to be sent by the network device to the terminal device, may be a reference signal, user data, or control information such as downlink control information (DCI), and may be borne in a physical downlink shared channel (PDSCH) or a physical downlink control channel (PDCCH). Specific content of the transport block is not limited in this embodiment of this application. It may be understood that the network device may repeatedly transmit the PDSCH, or may repeatedly transmit the PDCCH. If the network device repeatedly transmits the PDCCH, the terminal device may process a plurality of received PDCCHs jointly, to obtain scheduling information of the network device. Then, the terminal device receives a PDSCH or sends a PUSCH based on the scheduling information.

Optionally, the transmit beam that is of the network device and corresponds to each of the K downlink transmissions may be predefined, may be specified in a protocol, or may be autonomously determined by the network device when needing to perform downlink transmission.

In a possible implementation, that a first communications apparatus determines a receive beam that is of the first communications apparatus and corresponds to each of K transmissions of a same transport block includes: The first communications apparatus receives beam indication information sent by the second communications apparatus. The beam indication information is used to indicate the transmit beams that are of the second communications apparatus and corresponds to the K transmissions. The first communications apparatus determines, based on the beam indication information, the receive beam that is of the first communications apparatus and corresponds to each transmission.

In this way, the terminal device may determine, based on the beam indication information of the network device, the receive beam that is of the terminal device and corresponds to each transmission.

It should be understood that the terminal device communicates with the network device in a form of a beam, and the terminal device may determine a corresponding receive beam based on a transmit beam of the network device. In downlink transmission, the network device may notify the terminal device of the transmit beams of the network device, or may notify the terminal device of the receive beams of the terminal device. Therefore, the beam indication information may indicate the receive beams of the terminal device, or may indicate the transmit beams of the network device. For the beam indication information, refer to the foregoing descriptions. For example, the beam indication information herein may be an index or identifier of a beam (for example, a downlink reference signal). This is not limited in this embodiment of this application.

Optionally, the beam indication information may be carried in transmission configuration information. The transmission configuration information may be any one or a combination of the following: radio resource control (RRC) signaling, a media access control control element (MAC-CE), or DCI.

For example, when the transport block is a PDSCH, the transmission configuration information may be RRC signaling, a MAC-CE, DCI, or a combination thereof. Further, the beam indication information may be a transmission configuration indicator (TCI) states or quasi co-location (QCL) information that is used for the PDSCH and borne in a TCI domain (or field) in DCI. When the transport block is a PDCCH, the transmission configuration information may be RRC signaling, a MAC-CE, DCI, or a combination thereof. Further, the beam indication information is a TCI states or QCL information that is used for the PDCCH and carried in RRC signaling or a MAC-CE.

For example, in this embodiment of this application, the transmission configuration information may further be used to indicate a quantity of repeated transmissions of the same transport block. In addition, the quantity of repeated transmissions of the same transport block may alternatively be pre-configured by the network device. For details, refer to the prior art. Details are not described herein.

Optionally, the transmission configuration information may be carried in multi-level DCI. For example, the network device notifies the terminal device that two-level DCI is to be used. One piece of first-level DCI carries information such as time-frequency resource locations of the K transmissions, and K pieces of second-level DCI carry beam indication information of the K transmissions. The K pieces of second-level DCI may be respectively sent in K slots.

Further, the terminal device may determine, based on the received beam indication information and a mapping relationship (denoted as a first mapping relationship), the receive beam that is of the terminal device and corresponds to each transmission.

Specifically, the network device may send beam indication information to the terminal device. After receiving the beam indication information, the terminal device may determine, based on the first mapping relationship, a receive beam that is of the terminal device and corresponds to the beam indication information. The first mapping relationship may indicate a correspondence between the beam indication information and the receive beams of the terminal device. Alternatively, the first mapping relationship is a correspondence between the beam indication information and the receive beams of the terminal device. Alternatively, the first mapping relationship is a correspondence between the beam indication information and the transmit beams of the network device. Therefore, the terminal device may determine a transmit beam of the network device based on the first mapping relationship and received beam indication information, and then may determine a receive beam of the terminal device based on the transmit beam of the network device. The first mapping relationship may be maintained by the terminal device autonomously or configured by the network device.

It may be understood that different beam indication information may correspond to different receive beams of the terminal device. This is not limited in this embodiment of this application. For example, the terminal device may determine, based on the first mapping relationship, that receive beams that are of the terminal device and correspond to beam indication information "000" are a receive beam #1 and a receive beam #2. This represents that the terminal device may perform receiving for K times by using the receive beam #1 and the receive beam #2, according to a rule configured by the network device or a preset rule. For example, if K=4, the terminal device may perform receiving for four times by using the receive beam #1, the receive beam #2, the receive beam #1, and the receive beam #2 sequentially, or the terminal device may perform receiving for four times by using the receive beam #1, the receive beam #1, the receive beam #2, and the receive beam #2 sequentially.

Further, the first communications apparatus may first determine at least one of a quantity K of repeated transmissions of the same transport block and whether the transmit beams that are of the second communications apparatus and correspond to the K transmissions are all the same. When determining at least one of K>1 and that the transmit beams that are of the second communications apparatus and correspond to the K transmissions are not completely the same, the first communications apparatus determines, based on the first mapping relationship and the beam indication information, the receive beam that is of the first communications apparatus and corresponds to each transmission.

In other words, the terminal device determines, based on the first mapping relationship, the receive beam that is of the terminal device and corresponds to each transmission only when the terminal device determines that a quantity K of the transmissions is greater than 1 and/or determines that the transmit beams that are of the network device and correspond to the K transmissions are not completely the same.

In addition, when the terminal device determines that the quantity of the transmissions is 1, or K>1 and transmit beams corresponding to a plurality of transmissions of the same transport block are a same transmit beam, the terminal device may determine, based on a second mapping relationship, a receive beam used by the terminal device. The second mapping relationship may indicate a correspondence between the beam indication information and the receive beams of the terminal device. Alternatively, the second mapping relationship is a correspondence between the beam indication information and the receive beams of the terminal device. Alternatively, the second mapping relationship is a correspondence between the beam indication information and the transmit beams of the network device. Therefore, the terminal device may determine a transmit beam of the network device based on the second mapping relationship and received beam indication information, and then may determine a receive beam of the terminal device based on the transmit beam of the network device. It may be understood that the first mapping relationship is different from the second mapping relationship. In different scenarios, for example, when quantities of repeated transmissions are different, same beam indication information may correspond to different receive beams.

In a possible implementation, the method may further include:

The first communications apparatus receives at least one of first indication information and second indication information that are sent by the second communications apparatus. The first indication information is used to indicate a quantity of bits occupied by acknowledgment (ACK) information and/or negative acknowledgment (NACK) information, and the second indication information is used to indicate a redundancy version used for each transmission.

For example, the quantity of bits may be determined by using a function related to K. For example, the quantity of bits may be K, $\log_2$ K, or K+1.

Scenario 2

The transmit beams that are of the terminal device and correspond to the K transmissions are not completely the same. The receive beams that are of the network device and correspond to the K transmissions are in the one-to-one correspondence with the transmit beams that are of the terminal device and correspond to the K transmissions. To be specific, in an $N^{th}$ (where N is any value in 1, 2, . . . , and K) transmission, a transmit beam used by the terminal device corresponds to a receive beam used by the network device. In other words, when the terminal device uses a transmit beam for sending, the network device uses a receive beam corresponding to the transmit beam for receiving. However, it should be understood that one transmit beam of the terminal device may uniquely correspond to one receive beam of the network device, one transmit beam of the terminal device may correspond to a plurality of receive beams of the network device, or a plurality of transmit beams of the terminal device may correspond to one receive beam of the network device. This is not limited in this embodiment of this application.

According to the repeated transmission method in this embodiment of this application, in uplink communication, the terminal device uses different transmit beams in at least two of a plurality of transmissions, so that a probability of beam blocking can be reduced, thereby improving an uplink communication success rate.

It should be noted that the "transport block" in uplink transmission is essentially an information bit stream needing to be sent by the terminal device to the network device, may be an uplink reference signal, uplink user data, or control information such as uplink control information (UCI), and may be borne in a physical uplink shared channel (PUSCH) or a physical downlink control channel (PDCCH). Specific content of the transport block is not limited in this embodiment of this application. It may be understood that the terminal device may repeatedly transmit the PUSCH, or may repeatedly transmit the PUCCH.

Optionally, a receive beam that is of the network device and corresponds to each of the K transmissions may be predefined, may be specified in a protocol, or may be autonomously determined by the network device. Correspondingly, a transmit beam that is of the terminal device and corresponds to each of the K transmissions may be predefined, may be specified in a protocol, or may be configured by the network device.

In a possible implementation, after that a first communications apparatus determines a receive beam that is of the first communications apparatus and corresponds to each of K transmissions of a same transport block, the method further includes: The first communications apparatus sends beam indication information to the second communications apparatus. The beam indication information is used to indicate the receive beam that is of the first communications apparatus and corresponds to each transmission or indicate the transmit beam that is of the second communications apparatus and corresponds to each transmission.

In this way, the terminal device may determine, based on the beam indication information of the network device, the transmit beam that is of the terminal device and corresponds to each transmission.

It should be understood that the terminal device communicates with the network device in a form of a beam, and that the network device determines the receive beams of the network device may also be understood as that the network device determines the transmit beams of the terminal device. In uplink transmission, the network device may notify the terminal device of the receive beams of the network device, or may notify the terminal device of the transmit beams of the terminal device. Therefore, that the beam indication information indicates the transmit beams of the terminal device and that the beam indication information indicates the receive beams of the network device are equivalent concepts. For the beam indication information, refer to the foregoing descriptions. For example, the beam indication information herein may be an index or identifier of a beam. This is not limited in this embodiment of this application.

Optionally, the beam indication information may be carried in transmission configuration information. The transmission configuration information may be RRC signaling, a MAC-CE, DCI, or a combination thereof.

For example, when the transport block is a PUSCH, the transmission configuration information may be RRC signaling, a MAC-CE, DCI, or a combination thereof. Further, the beam indication information may be spatial relation information borne in a sounding reference signal resource indicator (SRI) domain (or field) in DCI. When the transport block is a PUCCH or UCI, the transmission configuration information may be RRC signaling, a MAC-CE, DCI, or a combination thereof. Further, the beam indication information is spatial relation information carried in RRC signaling or a MAC-CE.

For example, in this embodiment of this application, the transmission configuration information may further be used to indicate a quantity of repeated transmissions of the same transport block. In addition, the quantity of repeated transmissions of the same transport block may alternatively be pre-configured by the network device. For details, refer to the prior art. Details are not described herein.

In a possible implementation, the method further includes:

The first communications apparatus sends at least one of first indication information and second indication information to the second communications apparatus. The first indication information is used to indicate a quantity of bits occupied by acknowledgment (ACK) information and/or negative acknowledgment (NACK) information, and the second indication information is used to indicate a redundancy version used for each transmission.

For example, the quantity of bits is determined by using a function related to K. For example, the quantity of bits may be K, $\log_2$ K, or K+1.

The following describes some possible implementations that are applicable to both the scenario 1 and the scenario 2.

With reference to the first aspect, in a possible implementation of the first aspect, the method further includes:

The first communications apparatus sends beam feedback information to the second communications apparatus based on a measurement result of receive quality of each transmission. The beam feedback information is used to indicate one or more transmit beams, or the beam feedback information is used to indicate one or more slots corresponding to the one or more transmit beams. The one or more transmit beams are a portion or all of the transmit beams that are of the second communications apparatus and correspond to the K transmissions, and receive quality of the one or more transmit beams is greater than or less than that of another transmit beam that is other than the one or more transmit beams and in the transmit beams that are of the second communications apparatus and correspond to the K transmissions.

Optionally, the receive quality may be one or more of the following: reference signal received power (RSRP), a received signal strength indicator (RSSI), reference signal received quality (RSRQ), a signal to interference plus noise ratio (SINR), and a signal quality indicator (CQI).

Specifically, the first communications apparatus may measure signal quality of data on a transmit beam corresponding to each transmission or signal quality of a demodulation reference signal on a transmit beam corresponding to each transmission, for example, RSRP or an SINR, to determine a transmit beam with relatively good signal quality or a transmit beam with relatively poor signal quality based on measurement results. Then, the first communications apparatus may feed back the transmit beam with relatively good signal quality or a slot corresponding to the transmit beam with relatively good signal quality to the second communications apparatus. In this way, the second communications apparatus may use the transmit beam with relatively good signal quality in next transmission based on the feedback of the first communications apparatus, to improve a transmission success rate. Alternatively, the first communications apparatus may feed back, to the second communications apparatus, the transmit beam that has relatively poor signal quality and is of the second communications apparatus or a slot corresponding to the transmit beam that has relatively poor signal quality and is of the second communications apparatus. In this way, the second communications apparatus may avoid, based on the feedback of the first communications apparatus, using the transmit beam with relatively poor signal quality in next transmission, to improve a transmission success rate.

It should be understood that the beam feedback information may alternatively indicate a portion or all of the receive beams that are of the first communications apparatus and correspond to the K transmissions, and receive quality of the portion or all of the receive beams is greater than or less than that of another receive beam that is other than one or more receive beams and in the receive beams that are of the first communications apparatus and correspond to the K transmissions.

For example, the transmit beam with relatively good signal quality may be a transmit beam whose signal quality (for example, RSRP or SINR) is greater than or equal to a signal quality threshold, or may be one transmit beam with best signal quality or several transmit beams with relatively good signal quality in the at least two transmit beams corresponding to the K transmissions. Optionally, the signal quality threshold may be predefined, configured by the network device, or autonomously determined by the terminal device based on a capability of the terminal device.

With reference to the first aspect, in a possible implementation of the first aspect, that the first communications apparatus sends beam feedback information to the second communications apparatus based on a measurement result of receive quality of each transmission includes:

If failing to decode the transport block after the K transmissions, the first communications apparatus sends the beam feedback information and negative acknowledgment (NACK) information to the second communications apparatus.

Optionally, the first communications apparatus may first perform an operation on the beam feedback information and the NACK information, and then feed back an operation result to the second communications apparatus. For example, the operation may be a modulo-2 addition operation, an exclusive OR operation, or the like. This is not limited in this embodiment of this application. Alternatively, the first communications apparatus performs the foregoing operation on the beam feedback information and a mask of the NACK information, and then sends a result of the operation.

With reference to the first aspect, in a possible implementation of the first aspect, the method further includes: If successfully decoding the transport block after the K transmissions, the first communications apparatus sends, to the second communications apparatus, acknowledgment (ACK) information and at least one of an expected transmit beam and a quantity M of repeated transmissions required by the first communications apparatus. M is an integer less than or equal to K, and the expected transmit beam belongs to the transmit beams that are of the second communications apparatus and correspond to the K transmissions.

In this way, the second communications apparatus may adjust, based on the feedback of the first communications apparatus, the transmit beams or the quantity of transmissions when repeated transmissions are performed next time, so that communication efficiency and a system capacity can be improved.

With reference to the first aspect, in a possible implementation of the first aspect, the method further includes: The first communications apparatus determines a receive beam corresponding to a transmit beam with a lowest beam index in the one or more expected transmit beams as a default receive beam. The default receive beam is used to receive the transport block.

With reference to the first aspect, in a possible implementation of the first aspect, the method further includes: The first communications apparatus determines a receive beam corresponding to a transmit beam with a lowest beam index in the transmit beams that are of the second communications apparatus and correspond to the K transmissions as a default receive beam. The default receive beam is used to receive the transport block.

It may be understood that the default receive beam is used to receive the transport block. A default transmit beam is used to send the transport block. For a possible form of the transport block, refer to the foregoing descriptions. Details are not described herein again.

Specifically, in some scenarios, for example, when a downlink low-latency service is transmitted, the network device may not indicate the receive beams of the terminal device or the transmit beams of the network device, but directly uses the default transmit beam for transmission. Correspondingly, the terminal device uses the default receive beam for receiving. Generally, the default transmit beam is a beam used by the network device to send a PDCCH. When the network device uses at least two transmit beams to repeatedly transmit the PDCCH, because a beam for sending the PDCCH is not unique, a default beam needs to be redefined. In this application, a transmit beam with a lowest beam index in the at least two transmit beams for sending the PDCCH may be used as the default transmit beam. Alternatively, a transmit beam with a lowest beam index in several transmit beams that have relatively good receive quality and that are in the at least two transmit beams that are fed back by the terminal device and used to send the PDCCH is used as the default transmit beam. A corresponding receive beam is used as the default receive beam.

Correspondingly, in some scenarios, for example, when an uplink low-latency service is transmitted, the terminal device may directly use the default transmit beam for transmission. Correspondingly, the network device uses the default receive beam for receiving. Generally, the default transmit beam is a beam used by the terminal device to send a PUCCH. When the terminal device uses at least two transmit beams to repeatedly transmit the PUCCH, because a beam for sending the PUCCH is not unique, a default beam needs to be redefined. In this application, a transmit beam with a lowest beam index in the at least two transmit beams for sending the PUCCH may be used as the default transmit beam. Alternatively, a transmit beam with a lowest beam index in several transmit beams that have relatively good receive quality and that are in the at least two transmit beams that are fed back by the network device and used to send the PUCCH is used as the default transmit beam.

According to a second aspect, a repeated transmission method is provided. The method includes: A second communications apparatus determines a transmit beam that is of the second communications apparatus and corresponds to each of K transmissions of a same transport block. The second communications apparatus sends the transport block based on the transmit beam that is of the second communications apparatus and corresponds to each transmission. Transmit beams that are of the second communications apparatus and correspond to at least two of the K transmissions are different, and K is an integer greater than 1.

In the prior art, a same transmit beam is used for a plurality of transmissions of the same transport block. Consequently, communication may fail due to a cause such as beam blocking. According to the repeated transmission method in this embodiment of this application, different transmit beams are used in at least two of a plurality of transmissions, so that a probability of beam blocking can be reduced, thereby improving a communication success rate.

In this application, "receive beam" may also be replaced with "receive parameter", "spatial receive filter", "upload reference signal port", and the like, and "transmit beam" may also be replaced with "reference signal resource", "spatial transmit filter", "downlink reference signal port", and the like. For a specific concept of a beam, refer to descriptions in the following specific implementations. Details are not described herein.

It should be understood that the repeated transmission method provided in this application may be applied to downlink communication (scenario 1), and may also be applied to uplink communication (scenario 2). When the method in this application is applied to downlink communication, the first communications apparatus is a terminal device, and the second communications apparatus is a network device. When the method in this application is applied to uplink communication, the first communications apparatus is a network device, and the second communications apparatus is a terminal device. It should be further understood that K may also be referred to as an aggregation factor, and the repeated transmission method in this application may also be referred to as a slot aggregation method or a transmission time interval (TTI) bundling method.

Scenario 1

The transmit beams that are of the network device and correspond to the K transmissions are not completely the same. Receive beams that are of the terminal device and correspond to the K transmissions are in the one-to-one correspondence with the transmit beams that are of the network device and correspond to the K transmissions. To be specific, in an $N^{th}$ (where N is any value in 1, 2, . . . , and K) transmission, a transmit beam used by the network device corresponds to a receive beam used by the terminal device. In other words, when the network device uses a transmit beam for sending, the terminal device uses a receive beam corresponding to the transmit beam for receiving. However, it should be understood that one receive beam of the terminal device may uniquely correspond to one transmit beam of the network device, one receive beam of the terminal device may correspond to a plurality of transmit beams of the network device, or a plurality of receive beams of the terminal device may correspond to one transmit beam of the network device. This is not limited in this embodiment of this application.

According to the repeated transmission method in this embodiment of this application, in downlink communication, the network device uses different transmit beams in at least two of a plurality of transmissions, so that a probability of beam blocking can be reduced, thereby improving a downlink communication success rate.

In a possible implementation, before that the second communications apparatus sends the transport block based on the transmit beam that is of the second communications apparatus and corresponds to each transmission, the method further includes:

The second communications apparatus sends transmit beam indication information to the first communications apparatus. The beam indication information is used to indicate the transmit beams that are of the second communications apparatus and correspond to the K transmissions.

In this way, the terminal device may determine, based on the beam indication information of the network device, the receive beam that is of the terminal device and corresponds to each transmission.

Optionally, the beam indication information may be carried in transmission configuration information. The transmission configuration information may be RRC signaling, a MAC-CE, DCI, or a combination thereof.

For example, when the transport block is a PDSCH, the transmission configuration information may be RRC signaling, a MAC-CE, DCI, or a combination thereof. Further, the beam indication information may be a TCI states or QCL information that is used for the PDSCH and borne in a TCI domain (or field) in DCI. When the transport block is a PDCCH or DCI, the transmission configuration information may be RRC signaling, a MAC-CE, DCI, or a combination thereof. Further, the beam indication information is a TCI states or QCL information that is used for the PDCCH and carried in RRC signaling or a MAC-CE.

In a possible implementation, the method may further include:

The second communications apparatus sends at least one of first indication information and second indication information to the first communications apparatus. The first indication information is used to indicate a quantity of bits occupied by acknowledgment (ACK) information and/or negative acknowledgment (NACK) information, and the second indication information is used to indicate a redundancy version used for each transmission.

For example, the quantity of bits is determined by using a function related to K. For example, the quantity of bits may be K, $\log_2$ K, or K+1.

Scenario 2

In a possible implementation, that a second communications apparatus determines a transmit beam that is of the second communications apparatus and corresponds to each of K transmissions of a same transport block includes: The second communications apparatus receives beam indication information sent by the first communications apparatus. The second communications apparatus determines, based on the beam indication information, the transmit beam that is of the first communications apparatus and corresponds to each transmission. The beam indication information is used to indicate the receive beam that is of the first communications apparatus and corresponds to each transmission or indicate the transmit beam that is of the second communications apparatus and corresponds to each transmission, and the transmit beams that are of the second communications apparatus and correspond to the K transmissions are in a one-to-one correspondence with the receive beams that are of the first communications apparatus and correspond to the K transmissions.

The transmit beams that are of the terminal device and correspond to the K transmissions are not completely the same. The receive beams that are of the network device and correspond to the K transmissions are in the one-to-one correspondence with the transmit beams that are of the terminal device and correspond to the K transmissions. To be specific, in an $N^{th}$ (where N is any value in 1, 2, ..., and K) transmission, a transmit beam used by the terminal device corresponds to a receive beam used by the network device. In other words, when the terminal device uses a transmit beam for sending, the network device uses a receive beam corresponding to the transmit beam for receiving. However, it should be understood that one beam of the terminal device may uniquely correspond to one receive beam of the network device, one transmit beam of the terminal device may correspond to a plurality of receive beams of the network device, or a plurality of transmit beams of the terminal device may correspond to one receive beam of the network device. This is not limited in this embodiment of this application.

According to the repeated transmission method in this embodiment of this application, in uplink communication, the terminal device uses different transmit beams in at least two of a plurality of transmissions, so that a probability of beam blocking can be reduced, thereby improving an uplink communication success rate.

It should be understood that the terminal device communicates with the network device in a form of a beam, and that the network device determines the receive beams of the network device may also be understood as that the network device determines the transmit beams of the terminal device. In uplink transmission, the network device may notify the terminal device of the receive beams of the network device, or may notify the terminal device of the transmit beams of the terminal device. Therefore, that the beam indication information indicates the transmit beams of the terminal device and that the beam indication information indicates the receive beams of the network device are equivalent concepts. For the beam indication information, refer to the foregoing descriptions. For example, the beam indication information herein may be an index or identifier of a beam. This is not limited in this embodiment of this application.

Optionally, the beam indication information may be carried in transmission configuration information. The transmission configuration information may be RRC signaling, a MAC-CE, DCI, or a combination thereof.

For example, when the transport block is a PUSCH, the transmission configuration information may be RRC signaling, a MAC-CE, DCI, or a combination thereof. Further, the beam indication information may be spatial relation information borne in a sounding reference signal resource indicator (SRI) domain (or field) in DCI. When the transport block is a PUCCH or UCI, the transmission configuration information may be RRC signaling, a MAC-CE, DCI, or a combination thereof. Further, the beam indication information is spatial relation information carried in RRC signaling or a MAC-CE.

For example, in this embodiment of this application, the transmission configuration information may further be used to indicate a quantity of repeated transmissions of the same transport block. In addition, the quantity of repeated transmissions of the same transport block may alternatively be pre-configured by the network device. For details, refer to the prior art. Details are not described herein.

Further, the terminal device may determine, based on received beam indication information and a mapping relationship (denoted as a first mapping relationship), the transmit beam that is of the terminal device and corresponds to each transmission.

Specifically, the network device may send beam indication information to the terminal device. After receiving the beam indication information, the terminal device may determine, based on the first mapping relationship, a transmit beam that is of the terminal device and corresponds to the beam indication information. The first mapping relationship may indicate a correspondence between the beam indication information and the transmit beams of the terminal device. The first mapping relationship may indicate a correspondence between the beam indication information and the transmit beams of the terminal device. Alternatively, the first mapping relationship is a correspondence between the beam indication information and the transmit beams of the terminal device. Alternatively, the first mapping relationship is a correspondence between the beam indication information and the receive beams of the network device. Therefore, the terminal device may determine a receive beam of the network device based on the first mapping relationship and received beam indication information, and then may determine a transmit beam of the terminal device based on the receive beam of the network device. The first mapping relationship may be maintained by the terminal device autonomously or configured by the network device.

It may be understood that different beam indication information may correspond to different transmit beams of the terminal device. This is not limited in this embodiment of this application. For example, the terminal device may determine, based on the first mapping relationship, that transmit beams that are of the terminal device and correspond to beam indication information "000" are a transmit beam #1 and a transmit beam #2. This represents that the terminal device may perform sending for K times by using the transmit beam #1 and the transmit beam #2, according to a rule configured by the network device or a preset rule. For example, if K=4, the terminal device may perform sending for four times by using the transmit beam #1, the transmit beam #2, the transmit beam #1, and the transmit beam #2 sequentially, or the terminal device may perform sending for four times by using the transmit beam #1, the transmit beam #1, the transmit beam #2, and the transmit beam #2 sequentially.

Further, the second communications apparatus may first determine at least one of a quantity K of repeated transmissions of the same transport block and whether the transmit beams that are of the second communications apparatus and correspond to the K transmissions are all the same. When determining at least one of K>1 and that the transmit beams that are of the second communications apparatus and correspond to the K transmissions are not completely the same, the second communications apparatus determines, based on the first mapping relationship and the beam indication information, the transmit beam that is of the second communications apparatus and corresponds to each transmission.

In other words, the terminal device determines, based on the first mapping relationship, the transmit beam that is of the terminal device and corresponds to each transmission only when the terminal device determines that a quantity K of the transmissions is greater than 1 and/or determines that the transmit beams that are of the terminal device and correspond to the K transmissions are not completely the same.

In addition, when the terminal device determines that the quantity of the transmissions is 1, or K>1 and transmit beams corresponding to a plurality of transmissions of the same transport block are a same transmit beam, the terminal device determines, based on a second mapping relationship, a transmit beam used by the terminal device. The second mapping relationship may indicate a correspondence between the beam indication information and the transmit beams of the terminal device. Alternatively, the second mapping relationship is a correspondence between the beam indication information and the transmit beams of the terminal device. Alternatively, the second mapping relationship is a correspondence between the beam indication information and the receive beams of the network device. Therefore, the terminal device may determine a receive beam of the network device based on the second mapping relationship and received beam indication information, and then may determine a transmit beam of the terminal device based on the receive beam of the network device. It may be understood that the first mapping relationship is different from the second mapping relationship. In different scenarios, for example, when quantities of repeated transmissions are different, same beam indication information may correspond to different receive beams.

In a possible implementation, the method further includes:

The second communications apparatus receives at least one of first indication information and second indication information that are sent by the first communications apparatus. The first indication information is used to indicate a quantity of bits occupied by acknowledgment (ACK) information and/or negative acknowledgment (NACK) information, and the second indication information is used to indicate a redundancy version used for each transmission.

For example, the quantity of bits is determined by using a function related to K, for example, K, $\log_2$ K, or K+1.

The following describes some possible implementations that are applicable to both the scenario 1 and the scenario 2.

With reference to the second aspect, in a possible implementation of the second aspect, the method further includes:

The second communications apparatus receives beam feedback information. The beam feedback information is used to indicate one or more transmit beams, or the beam feedback information is used to indicate one or more slots corresponding to the one or more transmit beams. The one or more transmit beams are a portion or all of the transmit beams that are of the second communications apparatus and correspond to the K transmissions, and receive quality of the one or more transmit beams is greater than or less than that of another transmit beam that is other than the one or more transmit beams and in the transmit beams that are of the second communications apparatus and correspond to the K transmissions.

Optionally, the receive quality may be one or more of the following: reference signal received power (RSRP), a received signal strength indicator (RSSI), reference signal received quality (RSRP), a signal to interference plus noise ratio (SINR), and a signal quality indicator (CQI).

Specifically, the first communications apparatus may measure signal quality of data on a transmit beam corresponding to each transmission or signal quality of a demodulation reference signal on a transmit beam corresponding to each transmission, for example, RSRP or an SINR, to determine a transmit beam with relatively good signal quality or a transmit beam with relatively poor signal quality based on measurement results. Then, the first communications apparatus may feed back the transmit beam with relatively good signal quality or a slot corresponding to the transmit beam with relatively good signal quality to the second communications apparatus. In this way, the second communications apparatus may use the transmit beam with relatively good signal quality in next transmission based on the feedback of the first communications apparatus, to improve a transmission success rate. Alternatively, the first communications apparatus may feed back the transmit beam with relatively poor signal quality or a slot corresponding to the transmit beam with relatively poor signal quality to the second communications apparatus. In this way, the second communications apparatus may avoid, based on the feedback of the first communications apparatus, using the transmit beam with relatively poor signal quality in next transmission, to improve a transmission success rate.

It should be understood that the beam feedback information may alternatively indicate a portion or all of the receive beams that are of the first communications apparatus and correspond to the K transmissions, and receive quality of the portion or all of the receive beams is greater than or less than that of another receive beam that is other than the one or more receive beams and in the receive beams that are of the first communications apparatus and correspond to the K transmissions.

For example, the transmit beam with relatively good signal quality may be a transmit beam whose signal quality (for example, RSRP or SINR) is greater than or equal to a signal quality threshold, or may be one transmit beam with best signal quality or several transmit beams with relatively good signal quality in the at least two transmit beams corresponding to the K transmissions. Optionally, the signal quality threshold may be predefined, configured by the network device, or autonomously determined by the terminal device based on a capability of the terminal device.

With reference to the second aspect, in a possible implementation of the second aspect, that the second communications apparatus receives beam feedback information includes: The second communications apparatus receives the beam feedback information when receiving negative acknowledgment (NACK) information. The NACK information is used to indicate that the first communications apparatus successfully decodes the transport block.

With reference to the second aspect, in a possible implementation of the second aspect, the method further includes: The second communications apparatus receives acknowledgment (ACK) information and at least one of an expected transmit beam and a quantity M of repeated transmissions required by the first communications apparatus. M is an integer less than or equal to K, the expected transmit beam belongs to the transmit beams that are of the second communications apparatus and correspond to the K transmissions, and the ACK information is used to indicate that the first communications apparatus successfully decodes the transport block.

In this way, the second communications apparatus may adjust, based on the feedback of the first communications apparatus, the transmit beams or the quantity of transmissions when repeated transmissions are performed next time, so that communication efficiency and a system capacity can be improved.

With reference to the second aspect, in a possible implementation of the second aspect, the method further includes: The second communications apparatus determines a transmit beam with a lowest beam index in the one or more expected transmit beams as a default transmit beam. The default transmit beam is used to send the transport block.

With reference to the second aspect, in a possible implementation of the second aspect, the method further includes: The second communications apparatus determines a transmit beam with a lowest beam index in the transmit beams that are of the second communications apparatus and correspond to the K transmissions as a default transmit beam. The default transmit beam is used to send the transport block.

The solutions corresponding to or related to the second and first aspects may be referred to each other. Details are not described herein.

According to a third aspect, a communications apparatus is provided. The communications apparatus includes a unit configured to perform the method according to any one of the first aspect or the possible implementations of the first aspect. The unit included in the communications apparatus may be implemented by software and/or hardware.

According to a fourth aspect, a communications apparatus is provided. The communications apparatus includes a unit configured to perform the method according to any one of the second aspect or the possible implementations of the second aspect. The unit included in the communications apparatus may be implemented by software and/or hardware.

According to a fifth aspect, this application provides a communications device. The communications device includes at least one processor and a communications interface. The communications interface is used by the communications device to exchange information with another communications device. When a program instruction is executed by the at least one processor, the method according to any one of the first aspect or the possible implementations of the first aspect is implemented.

Optionally, the communications device may further include a memory. The memory is configured to store a program and data.

Optionally, the communications device may be a terminal device or a network device.

According to a sixth aspect, this application provides a communications device. The communications device includes at least one processor and a communications interface. The communications interface is used by the communications device to exchange information with another communications device. When a program instruction is executed by the at least one processor, the method according to any one of the second aspect or the possible implementations of the second aspect is implemented.

Optionally, the communications device may further include a memory. The memory is configured to store a program and data.

Optionally, the communications device may be a network device or a terminal device.

According to a seventh aspect, this application provides a computer-readable storage medium. The computer-readable storage medium stores program code for being executed by a communications device. The program code includes an instruction used to perform the method according to any one of the foregoing aspects or the possible implementations of the foregoing aspects.

For example, the computer-readable medium may store program code for being executed by a terminal device, and the program code includes an instruction used to perform the method according to any one of the first aspect or the possible implementations of the first aspect.

For example, the computer-readable medium may store program code for being executed by a network device, and the program code includes an instruction used to perform the method according to any one of the second aspect or the possible implementations of the second aspect.

According to an eighth aspect, this application provides a computer program product including an instruction. When the computer program product runs on a communications device, the communications device is enabled to execute an instruction of the method according to any one of the foregoing aspects or the possible implementations of the foregoing aspects.

For example, when the computer program product is executed on a terminal device, the terminal device is enabled to execute an instruction of the method according to any one of the first aspect or the possible implementations of the first aspect.

For example, when the computer program product is executed on a network device, the network device is enabled to execute an instruction of the method according to any one of the second aspect or the possible implementations of the second aspect.

According to a ninth aspect, this application provides a system chip. The system chip includes an input/output interface and at least one processor, and the at least one processor is configured to invoke an instruction in a memory, to perform an operation of the method according to any one of the foregoing aspects or the possible implementations of the foregoing aspects.

Optionally, the system chip may further include at least one memory and a bus, and the at least one memory is configured to store the instruction executed by the processor.

DESCRIPTION OF EMBODIMENTS

Figure 1:
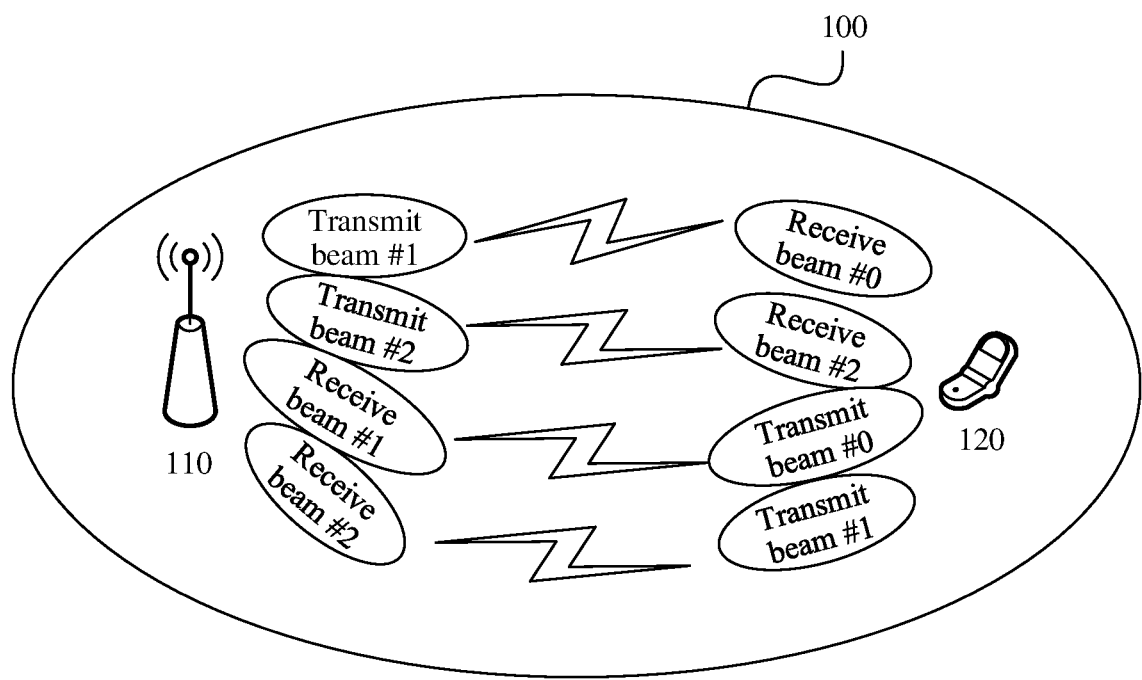
FIG. 1 is a schematic diagram of a communications system applied to this application.

The following describes the technical solutions of this application with reference to the accompanying drawings.

The technical solutions of embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A terminal device in the embodiments of this application may be user equipment (UE), an access terminal, a subscriber unit, a subscriber station, a mobile station, a remote station, a remote terminal, a mobile device, a user terminal, a terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a 5G network, a network device in a future evolved PLMN network, or the like. This is not limited in the embodiments of this application.

For ease of understanding of the embodiments of this application, "beam" is first briefly described.

The beam is a communications resource. The beam may be a wide beam, a narrow beam, or a beam of another type. A technology for forming the beam may be a beamforming technology or another technology. The beamforming technology may be specifically a digital beamforming technology, an analog beamforming technology, or a digital/analog mixed beamforming technology. Different beams may be considered as different resources. Same information or different information may be sent on different beams. Optionally, a plurality of beams having same or similar communication features may be considered as one beam. One beam may correspond to one or more antenna ports, and is used to transmit a data channel, a control channel, a sounding signal, and the like.

The beam may also be understood as a spatial resource, and may be a transmit precoding vector or receive precoding vector whose energy transmission is directional. That the energy transmission is directional may indicate that a signal that is precoded by using the precoding vector and received at a spatial location has a relatively good receive power, for example, meets a receive demodulation signal-to-noise ratio. That the energy transmission is directional may also indicate that a same signal sent from different spatial locations and received by using the precoding vector differs in a receive power. One device (for example, a network device or a terminal device) may have different precoding vectors. Different devices may also have different precoding vectors, in other words, correspond to different beams. For a configuration or capability of a device, one device may simultaneously use one or more of a plurality of different precoding vectors, in other words, may simultaneously form one beam or a plurality of beams. From two perspectives of transmitting and receiving, beams may be classified into a transmit beam and a receive beam.

The transmit beam is a directional beam that is transmitted through a multi-antenna by using the beamforming technology.

The receive beam means that signal receiving is also directional, and points to a direction of arrival of a transmit beam as much as possible, to further improve a received signal-to-noise indicator and avoid interference between users.

The beam may also be referred to as a spatial transmission filter, the transmit beam may also be referred to as a spatial transmit filter, and the receive beam may also be referred to as a spatial receive filter.

FIG. 1 is a schematic diagram of a communications system 100 applicable to an embodiment of this application. As shown in FIG. 1, the communications system 100 includes at least one network device 110 and at least one terminal device 120. In the communications system 100, the terminal device and the network device may obtain, by performing a beam management process, one or more relatively good beam pairs used for communication. The beam pairs are <Bx, B'x> and <By, B'y>, where Bx represents a transmit beam of the network device, B'x represents a receive beam of the terminal device, By represents a transmit beam of the terminal device, and B'y represents a receive beam of the network device. For example, referring to FIG. 1, a transmit beam #1 of the network device and a receive beam #0 of the terminal device constitute a beam pair, and a transmit beam #2 of the network device and a receive beam #2 of the terminal device constitute a beam pair. A transmit beam #0 of the terminal device and a receive beam #1 of the network device constitute a beam pair, and a transmit beam #1 of the terminal device and a receive beam #2 of the network device constitute a beam pair.

In the communications system 100, normal communication can be performed only after a beam of the terminal device 120 aligns with a beam of the network device 110. Because the terminal device and the network device each can face toward a plurality of beam directions, a prerequisite for communication is that a correct beam indication is required. Specifically, in downlink communication, the network device needs to notify the terminal device of a receive beam that should be used to receive a signal sent by the network device next, or notify the terminal device of a transmit beam that is used to send a signal sent by the network device next. In uplink communication, the network device needs to notify the terminal device of a transmit beam that should be used to send an uplink signal, or notify the terminal device of a receive beam that will be used by the network device to receive a signal sent by the terminal. For example, in downlink transmission, the network device may notify the terminal device that the network device uses the transmit beam #1 for transmission. In this case, the terminal device needs to use the receive beam #0 for receiving. Alternatively, the network device uses the transmit beam #1 for transmission, and notifies the terminal device to use the receive beam #0 for receiving. For another example, in uplink transmission, the network device may notify the terminal device to use the transmit beam #0 for transmission. In this case, the network device uses the receive beam #1 for receiving. Alternatively, the network device may notify the network device that a receive beam used by the network device is the receive beam #1, so that the terminal device needs to use the transmit beam #0 for transmission.

Information used to indicate a beam may be referred to as, for example, beam indication information. The beam indication information may be one or more of the following: a beam identification (or number, index, identity (ID), and the like), an uplink signal resource number, a downlink signal resource number, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, or an index of a transmit codebook corresponding to a beam. The downlink signal may be one or more of the following: a synchronization signal, a broadcast channel, a broadcast signal demodulation signal, a synchronization signal and PBCH block (SSB), a channel state information reference signal (CSI-RS), a cell-specific reference signal (CS-RS), a UE-specific reference signal (US-RS), a downlink control channel demodulation reference signal (DMRS), a downlink data channel demodulation reference signal, or a downlink phase noise tracking signal. The uplink signal may be one or more of the following: an uplink random access sequence, an uplink sounding reference signal (SRS), an uplink control channel demodulation reference signal, an uplink data channel demodulation reference signal, or an uplink phase noise tracking signal.

The beam indication information may also be reflected as a transmission configuration index (TCI) or a TCI states. One TCI states includes one or more pieces of QCL information, and each piece of QCL information includes an ID of one reference signal (or synchronization signal block) and one QCL type. The terminal device may determine, based on a TCI states (which is usually carried in a control channel PDCCH) indicated by the network device, a beam for receiving a PDSCH.

For example, a structure of the TCI states is as follows:

```
TCI-State ::=                SEQUENCE {
    tci-StateId                  TCI-StateId,
    qcl-Type1                    QCL-Info,
    qcl-Type2                    QCL-Info
    ...
}
QCL-Info ::=                 SEQUENCE {
    cell                         ServCellIndex
    bwp-Id                       BWP-Id
    referenceSignal              CHOICE {
        csi-rs                       NZP-CSI-RS-ResourceId,
        ssb                          SSB-Index,
        csi-RS-for-tracking          NZP-CSI-RS-ResourceSetId
    },
    qcl-Type                     ENUMERATED {typeA, typeB, typeC, typeD},
    ...
}
```

For an uplink beam indication, a similar method is specified in NR. In a protocol, a beam indication of an uplink data channel PUSCH is implicitly reflected as a sounding reference signal resource indicator (SRI) field in DCI. A transmit beam indication of an SRS identified by the SRI is indicated by using RRC or a MAC-CE. The uplink beam indication in NR is named SpatialRelationInfo, and one piece of SpatialRelationInfo includes reference information of an uplink transmit beam, information related to uplink transmit power control, and the like.

For example, a structure of SpatialRelationInfo is as follows:

```
SpatialRelationInfo ::=          SEQUENCE {
    SpatialRelationInfoId        SpatialRelationInfoId,
    servingCellId                        ServCellIndex
    referenceSignal              CHOICE {
        ssb-Index                        SSB-Index,
        csi-RS-Index                     NZP-CSI-RS-ResourceId,
        srs                              SEQUENCE {
                                             resource
            SRS-ResourceId,
                                             uplinkBWP
            BWP-Id
                                         }
    },
    PathlossReferenceRS-Id       PathlossReferenceRS-Id,
    p0- Id                       P0-Id,
    closedLoopIndex                      ENUMERATED { i0, i1 }
}
```

It should be understood that, in the embodiments of this application, that the network device or the terminal device determines a beam (a transmit beam or a receive beam) may also be understood as that the network device or the terminal device determines the foregoing beam indication information. The concept of the beam described in this application may be replaced with any type of information in the foregoing beam indication information.

In high-frequency communication, to enhance coverage, for a terminal device with relatively poor signal quality, for example, a terminal device at a cell edge, a network device may perform downlink transmission through aggregation transmission. To be specific, the network device repeatedly sends a transport block (TB) for a plurality of times. For example, the network device repeatedly sends a same signal at same time-frequency resource locations in a plurality of slots. The terminal device may combine a plurality of received signals and decode the TB. This can improve a received signal-to-noise indicator. Similarly, the network device may also schedule the terminal device to perform uplink transmission through aggregation transmission.

In the prior art, in the aggregation transmission, a same beam is used in a plurality of slots. Consequently, communication may fail due to a cause such as beam blocking. In view of this, this application provides a repeated transmission method. In this method, a second communications apparatus or a first communications apparatus uses different transmit beams in at least two of a plurality of transmissions, so that a probability of beam blocking can be reduced, thereby improving a communication success rate.

The repeated transmission method provided in this application may be applied to downlink communication, and may also be applied to uplink communication. When the method in this application is applied to downlink communication, the first communications apparatus is a terminal device, and the second communications apparatus is a network device. When the method in this application is applied to uplink communication, the first communications apparatus is a network device, and the second communications apparatus is a terminal device.

Figure 2:
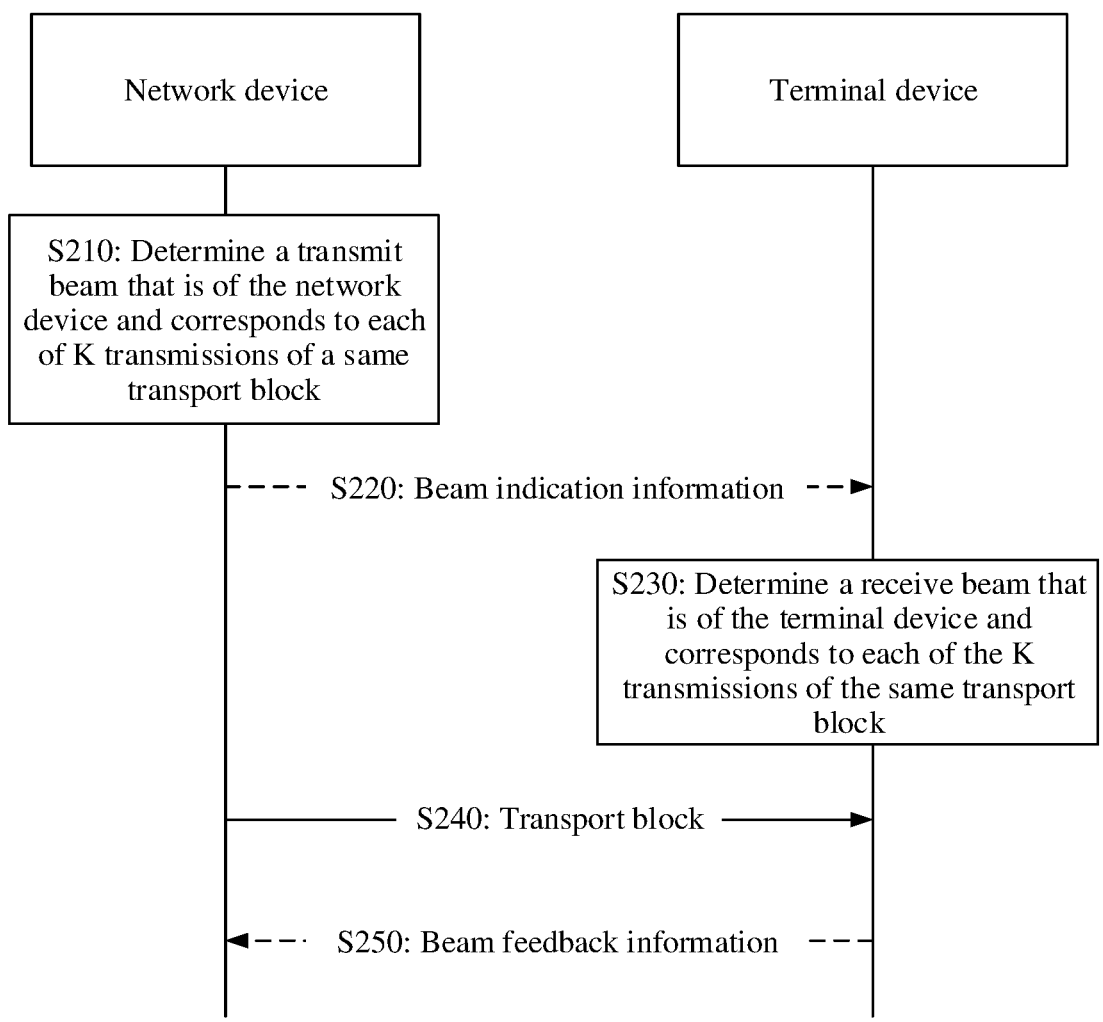
FIG. 2 is a schematic diagram of a repeated transmission method according to an embodiment of this application.

FIG. 2 is a schematic flowchart of a repeated transmission method 200 according to an embodiment of this application. As shown in FIG. 2, the method 200 mainly includes S210, S230, and S240. The method 200 may further include optional steps S220 and S250. The method shown in FIG. 2 may be applied to downlink communication.

S210: A network device determines a transmit beam that is of the network device and corresponds to each of K transmissions of a same transport block.

Transmit beams that are of the network device and correspond to at least two of the K transmissions are different, and K is an integer greater than 1. In other words, the transmit beams that are of the network device and correspond to the K transmissions are not completely the same. It may be understood that, receive beams that are of a terminal device and correspond to the K transmissions are in a one-to-one correspondence with the transmit beams that are of the network device and correspond to the K transmissions. To be specific, in an $N^{th}$ (where N is any value in 1, 2, . . . , and K) transmission, a transmit beam used by the network device corresponds to a receive beam used by the terminal device. In other words, when the network device uses a transmit beam for sending, the terminal device uses a receive beam corresponding to the transmit beam for receiving. However, it should be understood that one receive beam of the terminal device may uniquely correspond to one transmit beam of the network device, or one receive beam of the terminal device may correspond to a plurality of transmit beams of the network device.

It should be understood that, that the network device determines the transmit beams of the network device may also be understood as that the network device determines the receive beams of the terminal device. It should be noted that, in this application, a "transport block" in downlink transmission is essentially an information bit stream needing to be sent by the network device to the terminal device, and may be a reference signal, user data, or control information such as DCI. The DCI is borne in a PDSCH or a PDCCH. Specific content of the transport block is not limited in this embodiment of this application. It may be understood that the network device may repeatedly transmit the PDSCH, or may repeatedly transmit the PDCCH. If the network device repeatedly transmits the PDCCH, the terminal device may process a plurality of received PDCCHs jointly, to obtain scheduling information of the network device. Then, the terminal device receives a PDSCH or sends a PUSCH based on the scheduling information.

It should be understood that K may also be referred to as an aggregation factor, and a method for a plurality of transmissions of the same transport block by the network device may also be referred to as a slot aggregation method or a transmission time interval (TTI) bundling method.

Optionally, the transmit beam that is of the network device and corresponds to each of the K transmissions may be predefined, may be specified in a protocol, or may be autonomously determined by the network device when needing to perform downlink transmission.

S220: The network device sends beam indication information to the terminal device. The beam indication information is used to indicate the transmit beam that is of the network device and corresponds to each of the K transmissions of the transport block.

It should be understood that the terminal device communicates with the network device in a form of a beam, and the terminal device may determine a corresponding receive beam based on a transmit beam of the network device. In downlink transmission, the network device may notify the terminal device of the transmit beams of the network device, or may notify the terminal device of the receive beams of the terminal device. Therefore, the beam indication information may indicate the receive beams of the terminal device, or may indicate the transmit beams of the network device. For the beam indication information, refer to the foregoing descriptions. For example, the beam indication information herein may be an index or identifier of a beam (for example, a downlink reference signal). This is not limited in this embodiment of this application.

Optionally, the beam indication information may be carried in transmission configuration information. The transmission configuration information may be any one of or a combination of the following: RRC signaling, a MAC-CE, or DCI.

For example, when the transport block is a PDSCH, the transmission configuration information may be RRC signaling, a MAC-CE, DCI, or a combination thereof. Further, the beam indication information may be a TCI states or QCL information that is used for the PDSCH and borne in a TCI domain (or field) in DCI. When the transport block is a PDCCH or DCI, the transmission configuration information may be RRC signaling, a MAC-CE, DCI, or a combination thereof. Further, the beam indication information is a TCI states or QCL information that is used for the PDCCH and carried in RRC signaling or a MAC-CE.

For example, in this embodiment of this application, the transmission configuration information may further be used to indicate a quantity of repeated transmissions of the same transport block. In addition, the quantity of repeated transmissions of the same transport block may alternatively be pre-configured by the network device. For details, refer to the prior art. Details are not described herein.

For example, the transmission configuration information may be carried in multi-level DCI. For example, the network device notifies the terminal device that two-level DCI is to be used. One piece of first-level DCI carries information such as time-frequency resource locations of the K transmissions, and K pieces of second-level DCI carry beam indication information of the K transmissions. The K pieces of second-level DCI may be respectively sent in K slots.

S230: The terminal device determines the receive beam that is of the terminal device and corresponds to each of the K transmissions of the transport block.

For example, the terminal device may determine, according to a predefined rule or a protocol specification, the receive beam that is of the terminal device and corresponds to each transmission.

Optionally, if receiving the beam indication information sent by the network device in S220, the terminal device determines, based on the beam indication information, the receive beam that is of the terminal device and corresponds to each transmission. Specifically, the terminal device may determine the transmit beams of the network device based on the beam indication information, and then determine the receive beams of the terminal device based on the transmit beams of the network device.

It should be understood that, that the terminal device determines the receive beams of the terminal device may also be understood as that the terminal device determines the transmit beams of the network device.

S240: The network device sends the transport block based on the transmit beam that is of the network device and corresponds to each transmission. Correspondingly, the terminal device receives the transport block based on the receive beam that is of the terminal device and corresponds to each transmission.

Specifically, the network device may repeatedly transmit the same transport block for K times, and use different transmit beams in at least two of the K transmissions. For example, K=4. The network device may respectively use four different transmit beams to perform four transmissions. Alternatively, the network device may use a same transmit beam #A in two of the four transmissions, and use other two transmit beams different from the transmit beam #A in the other two of the four transmissions. Alternatively, the network device may use a transmit beam #A in one of the four transmissions, and use a transmit beam #B different from the transmit beam #A in the other three of the four transmissions. Correspondingly, in each transmission, the terminal device uses a receive beam corresponding to a transmit beam of the network device to perform receiving.

It should be understood that, in this embodiment of this application, the K transmissions may be performed in K consecutive slots, or may be performed in K inconsecutive slots. This is not limited in this embodiment of this application. In addition, in the K transmissions, same time-frequency resources in the K slots may be used, or different time-frequency resources in the K slots may be used. Time-frequency resources used in the K transmissions are not limited in this embodiment of this application.

In the prior art, a same transmit beam is used for a plurality of transmissions of the same transport block. Consequently, communication may fail due to a cause such as beam blocking. According to the repeated transmission method in this embodiment of this application, the network device uses different transmit beams in at least two of a plurality of transmissions, so that a probability of beam blocking can be reduced, thereby improving a downlink communication success rate.

Optionally, in a possible implementation of S230, the terminal device may determine, based on the received beam indication information and a mapping relationship (denoted as a first mapping relationship), the receive beam that is of the terminal device and corresponds to each transmission.

Specifically, the network device may send beam indication information to the terminal device. After receiving the beam indication information, the terminal device may determine, based on the first mapping relationship, a receive beam that is of the terminal device and corresponds to the beam indication information. The first mapping relationship may indicate a correspondence between the beam indication information and the receive beams of the terminal device. Alternatively, the first mapping relationship is a correspondence between the beam indication information and the receive beams of the terminal device. Alternatively, the first mapping relationship is a correspondence between the beam indication information and the transmit beams of the network device. Therefore, the terminal device may determine a transmit beam of the network device based on the first mapping relationship and received beam indication information, and then may determine a receive beam of the terminal device based on the transmit beam of the network device. The first mapping relationship may be maintained by the terminal device autonomously or configured by the network device.

It may be understood that different beam indication information may correspond to different receive beams of the terminal device. This is not limited in this embodiment of this application. For example, for a downlink data channel, the terminal device may determine, based on the first mapping relationship, that receive beams that are of the terminal device and correspond to beam indication information are a receive beam #1 and a receive beam #2, where the beam indication information is that a TCI domain (or field) in DCI is "000". This represents that the terminal device may perform receiving for K times by using the receive beam #1 and the receive beam #2, according to a rule configured by the network device or a preset rule. For example, if K=4, the terminal device may perform receiving for four times by using the receive beam #1, the receive beam #2, the receive beam #1, and the receive beam #2 sequentially, or the terminal device may perform receiving for four times by using the receive beam #1, the receive beam #1, the receive beam #2, and the receive beam #2 sequentially.

Further, the terminal device determines, based on the first mapping relationship, the receive beam that is of the terminal device and corresponds to each transmission only when the terminal device determines that a quantity K of the transmissions is greater than 1 and/or determines that the transmit beams that are of the network device and correspond to the K transmissions are not completely the same.

In addition, when the terminal device determines that the quantity of the transmissions is 1, or K>1 and transmit beams corresponding to a plurality of transmissions of the same transport block are a same transmit beam, the terminal device may determine, based on a second mapping relationship, a receive beam used by the terminal device. The second mapping relationship may indicate a correspondence between the beam indication information and the receive beams of the terminal device. Alternatively, the second mapping relationship is a correspondence between the beam indication information and the receive beams of the terminal device. Alternatively, the second mapping relationship is a correspondence between the beam indication information and the transmit beams of the network device. Therefore, the terminal device may determine a transmit beam of the network device based on the second mapping relationship and received beam indication information, and then may determine a receive beam of the terminal device based on the transmit beam of the network device. It may be understood that the first mapping relationship is different from the second mapping relationship. In different scenarios, for example, when quantities of repeated transmissions are different, same beam indication information may correspond to different receive beams.

For example, the beam indication information is a TCI states. Table 1 shows a correspondence between the beam indication information and the receive beams of the terminal device. A correspondence between beam indication information shown in the first column and a receive beam of the terminal device shown in the second column is the second mapping relationship. A correspondence between beam indication information shown in the first column and a receive beam of the terminal device shown in the third column is the first mapping relationship.

TABLE 1

| Beam indication information, namely, a TCI field in DCI | Corresponding TCI status or identifier of a receive beam of the terminal device | Corresponding TCI status list or identifier of a receive beam of the terminal device |
| --- | --- | --- |
| 000 | TCI status 1 (or receive beam 1 of the terminal device) | TCI statuses {1, 2} (or receive beams 1 and 2 of the terminal device) |
| 001 | TCI status 2 (or receive beam 2 of the terminal device) | TCI statuses {1, 2, 3} (or receive beams 1, 2, and 3 of the terminal device) |
| ... | ... | ... |
| 111 | TCI status 8 (or receive beam 8 of the terminal device) | TCI statuses {1, 2, 4} (or receive beams 1, 2, and 4 of the terminal device) |

Based on the foregoing descriptions, because K is greater than 1, the terminal device may determine, in the third column in Table 1, a receive beam corresponding to beam indication information received by the terminal device. For example, if the beam indication information received by the terminal device is "111", the terminal device may determine that corresponding receive beams are the receive beam #1, the receive beam #2, and a receive beam #4. For example, if K=4, the terminal device may use the receive beam #1 in the first transmission to receive the transport block sent by the network device, use the receive beam #2 in the second transmission to receive the transport block sent by the network device, use the receive beam #4 in the third transmission to receive the transport block sent by the network device, and use the receive beam #1 in the fourth transmission to receive the transport block sent by the network device. It should be understood that, if a quantity of transmissions of a transport block is 1, or if the terminal device determines that transmit beams that are of the network device and correspond to a plurality of transmissions of a transport block are the same, the terminal device may determine, in the second column in Table 1, a receive beam corresponding to the beam indication information received by the terminal device. For example, when K=4, the terminal device determines that receive beams that are of the terminal device and correspond to a plurality of transmissions of a transport block are the same, and the beam indication information received by the terminal device is "111", the terminal device will use the receive beam #8 to perform receiving for four times.

It should be understood that the first mapping relationship and the second mapping relationship may be pre-configured by the network device, or may be specified in a protocol. This is not limited in this embodiment of this application. For example, the network device may configure the first mapping relationship and the second mapping relationship by using RRC signaling, a MAC-CE, or a combination thereof.

Optionally, in this embodiment of this application, the terminal device may determine, based on indication information #1, whether a plurality of transmissions of the same transport block correspond to a same transmit beam of the network device.

Specifically, the network device may send the indication information #1 to the terminal device. The terminal device may first determine, based on the indication information #1, whether a plurality of repeated transmissions of the same transport block correspond to a same transmit beam, and then determine, based on a determining result, whether to determine a receive beam based on the first mapping relationship or determine a receive beam based on the second mapping relationship. For example, the indication information #1 may be information that is borne in an indication field #A and used to indicate whether a plurality of transmissions of the same transport block correspond to a same transmit beam of the network device. The indication field #A may include one bit. If the bit is 0, it may represent that the plurality of transmissions of the same transport block correspond to a same transmit beam of the network device. If the bit is 1, it may represent that transmit beams that are of the network device and correspond to the plurality of transmissions of the same transport block are not completely the same. Therefore, the terminal device may determine, based on the information borne in the indication field #A, whether the plurality of transmissions of the same transport block correspond to a same transmit beam of the network device. It should be understood that a quantity of bits occupied by the indication field #A is not limited in this embodiment of this application, and a specific meaning represented by the bit being 0 or 1 is not limited either.

It should be understood that the indication information #1 may be carried in the transmission configuration information. This is not limited in this embodiment of this application. For example, the transmission configuration information may be RRC signaling, and the indication information #1 may be carried in DCI.

Optionally, in an embodiment of this application, the method may further include: The network device sends indication information #2 (namely, first indication information) to the terminal device. Correspondingly, the terminal device receives the indication information #2 sent by the network device. The indication information #2 is used to indicate a quantity of bits occupied by ACK information and/or NACK information. For example, the quantity of bits occupied by the ACK information and/or the NACK information may be determined by using a function related to K, for example, K, $\log_2$ K, $\log_2$ K+1, $\log_2$ (K+1), or K+1. This is not limited in this embodiment of this application.

Optionally, in an embodiment of this application, the method may further include: The network device sends indication information #3 (namely, second indication information) to the terminal device. Correspondingly, the terminal device receives the indication information #3 sent by the network device. The indication information #3 is used to indicate a redundancy version used for each transmission or used to indicate whether redundancy versions used for the K transmissions are the same.

For example, when a configuration of the redundancy versions does not match the quantity of repeated transmissions, that is, when a quantity of redundancy versions corresponding to the K transmissions is not equal to K, the terminal device may truncate or repeat the redundancy versions. For example, the second indication information is 0213. If K=4, the terminal device considers that the redundancy versions of the four repeated transmissions are a version 0, a version 2, a version 1, and a version 3 in sequence. If K=2, the terminal device considers that the redundancy versions of the two repeated transmissions are the version 0 and the version 2 in sequence. If K=8, the terminal device considers that the redundancy versions of the eight repeated transmissions are the version 0, the version 2, the version 1, the version 3, the version 0, the version 2, the version 1, and the version 3 in sequence.

It should be understood that the indication information #2 and the indication information #3 may be carried in the transmission configuration information. This is not limited in this embodiment of this application. For example, the transmission configuration information may be RRC signaling, and the indication information #2 and the indication information #3 may be carried in DCI.

Optionally, in an embodiment of this application, the method may further include:

S250: The terminal device sends beam feedback information to the network device based on a measurement result of receive quality of each transmission.

The beam feedback information is used to indicate one or more transmit beams, or the beam feedback information is used to indicate one or more slots corresponding to the one or more transmit beams. The one or more transmit beams are a portion or all of the transmit beams that are of the network device and correspond to the K transmissions, and receive quality of the one or more transmit beams is greater than or less than that of another transmit beam that is other than the one or more transmit beams and in the transmit beams that are of the network device and correspond to the K transmissions.

Optionally, the receive quality may be one or more of the following: RSRP, an RSSI, RSRP, an SINR, or a CQI.

Specifically, the terminal device may measure signal quality of data on a transmit beam corresponding to each transmission or signal quality of a demodulation reference signal on a transmit beam corresponding to each transmission, for example, RSRP or an SINR, to determine a transmit beam with relatively good signal quality or a transmit beam with relatively poor signal quality based on measurement results. Then, the terminal device may feed back the transmit beam with relatively good signal quality or a slot corresponding to the transmit beam with relatively good signal quality to the network device. In this way, the network device may use the transmit beam with relatively good signal quality in next transmission based on the feedback of the terminal device, to improve a transmission success rate. Alternatively, the terminal device may feed back the transmit beam with relatively poor signal quality or a slot corresponding to the transmit beam with relatively poor signal quality to the network device. In this way, the network device may avoid, based on the feedback of the terminal device, using the transmit beam with relatively poor signal quality in next transmission, to improve a transmission success rate.

It should be understood that the beam feedback information may alternatively indicate a portion or all of the receive beams that are of the terminal device and correspond to the K transmissions, and receive quality of the portion or all of the receive beams is greater than or less than that of another receive beam that is other than the one or more receive beams and in the receive beams that are of the terminal device and correspond to the K transmissions.

For example, the transmit beam with relatively good signal quality may be a transmit beam whose corresponding signal quality (for example, RSRP or SINR) is greater than or equal to a signal quality threshold, or may be one transmit beam with best signal quality or several transmit beams with relatively good signal quality in the at least two transmit beams corresponding to the K transmissions. Optionally, the signal quality threshold may be predefined, configured by the network device, or autonomously determined by the terminal device based on a capability of the terminal device.

For example, the beam feedback information may be an index of a transmit beam of the network device, a relative index of a transmit beam of the network device, or a bitmap. Alternatively, the beam feedback information may be an index of a slot, a relative index of a slot, or a bitmap. For example, if the beam feedback information is a bitmap "1100", it represents that measurement results of receive beams corresponding to the first transmission and the second transmission in the four transmissions are better.

Further, S250 may be performed when the terminal device fails to decode the transport block sent by the network device. In addition, in this case, the terminal device may further feed back NACK information to the network device, to notify the network device that the terminal device fails to decode the transport block. After receiving the NACK information, the network device may retransmit the transport block.

It should be understood that, in this embodiment of this application, the terminal device may combine signals received in different slots and then perform decoding, or may separately decode a signal received in each slot.

In a possible implementation, the terminal device may first perform an operation on the beam feedback information and the NACK information, and then feed back an operation result to the network device. For example, the operation may be a modulo-2 addition operation, an exclusive OR operation, or the like. This is not limited in this embodiment of this application. Alternatively, the terminal device performs the foregoing operation on the beam feedback information and a mask of the NACK information, and then sends a result of the operation.

In addition, S250 may alternatively be performed when the terminal device successfully decodes the transport block sent by the network device. In addition, in this case, the terminal device may further feed back ACK information to the network device, to notify the network device that the terminal device successfully decodes the transport block. It should be understood that, for a manner in which the terminal device feeds back the ACK information and the beam feedback information, refer to the manner in which the terminal device feeds back the NACK information and the beam feedback information. Details are not described herein again.

Optionally, in an embodiment of this application, if the terminal device successfully decodes the transport block, when feeding back the ACK information to the network device, the terminal device may simultaneously feed back, to the network device, at least one of a quantity M of repeated transmissions required by the terminal device and a transmit beam expected by the terminal device; or simultaneously feed back, to the network device, at least one of a quantity M of repeated transmissions required by the terminal device and a receive beam expected by the terminal device. M is an integer less than or equal to K, the expected transmit beam belongs to the transmit beams that are of the network device and correspond to the K transmissions, and the expected receive beam belongs to the receive beams that are of the terminal device and correspond to the K transmissions.

For example, in S240, when attempting to combine signals received in different slots and then perform decoding, the terminal device finds that successful decoding requires only signals in the $0^{th}$ slot and the $2^{nd}$ slot. In this case, the terminal device may feed back ACK+ (1010) to the network device. The network device may adjust scheduling based on information fed back by the terminal device. For example, the network device reduces the quantity of repeated transmissions to 2, and performs repeated transmissions on a transmit beam corresponding to the $0^{th}$ slot and a transmit beam corresponding to the $2^{nd}$ slot.

Optionally, in an embodiment of this application, the terminal device may determine a receive beam corresponding to a transmit beam with a lowest (or smallest) beam index in the one or more expected transmit beams as a default receive beam. Correspondingly, the network device may determine the transmit beam with the lowest beam index in the one or more expected transmit beams as a default transmit beam.

Optionally, in an embodiment of this application, the terminal device may determine a receive beam corresponding to a transmit beam with a lowest (or smallest) beam index in the transmit beams that are of the network device and correspond to the K transmissions as a default receive beam. Correspondingly, the network device may determine the transmit beam with the lowest beam index in the transmit beams that are of the network device and correspond to the K transmissions as a default transmit beam.

It may be understood that the default receive beam is used to receive the transport block. The default transmit beam is used to send the transport block. For a possible form of the transport block, refer to the foregoing descriptions. Details are not described herein again.

Specifically, in some scenarios, for example, when a low-latency service is transmitted, the network device may not indicate the receive beams of the terminal device or the transmit beams of the network device, but directly uses the default transmit beam for transmission. Correspondingly, the terminal device uses the default receive beam for receiving. Generally, the default transmit beam is a beam used by the network device to send a PDCCH. When the network device uses at least two transmit beams to repeatedly transmit the PDCCH, because a beam for sending the PDCCH is not unique, a default beam needs to be redefined. In this application, a transmit beam with a lowest beam index in the at least two transmit beams for sending the PDCCH may be used as the default transmit beam. Alternatively, a transmit beam with a lowest beam index in several transmit beams that have relatively good receive quality and that are in the at least two transmit beams that are fed back by the terminal device and used to send the PDCCH is used as the default transmit beam. A corresponding receive beam is used as the default receive beam.

Figure 3:
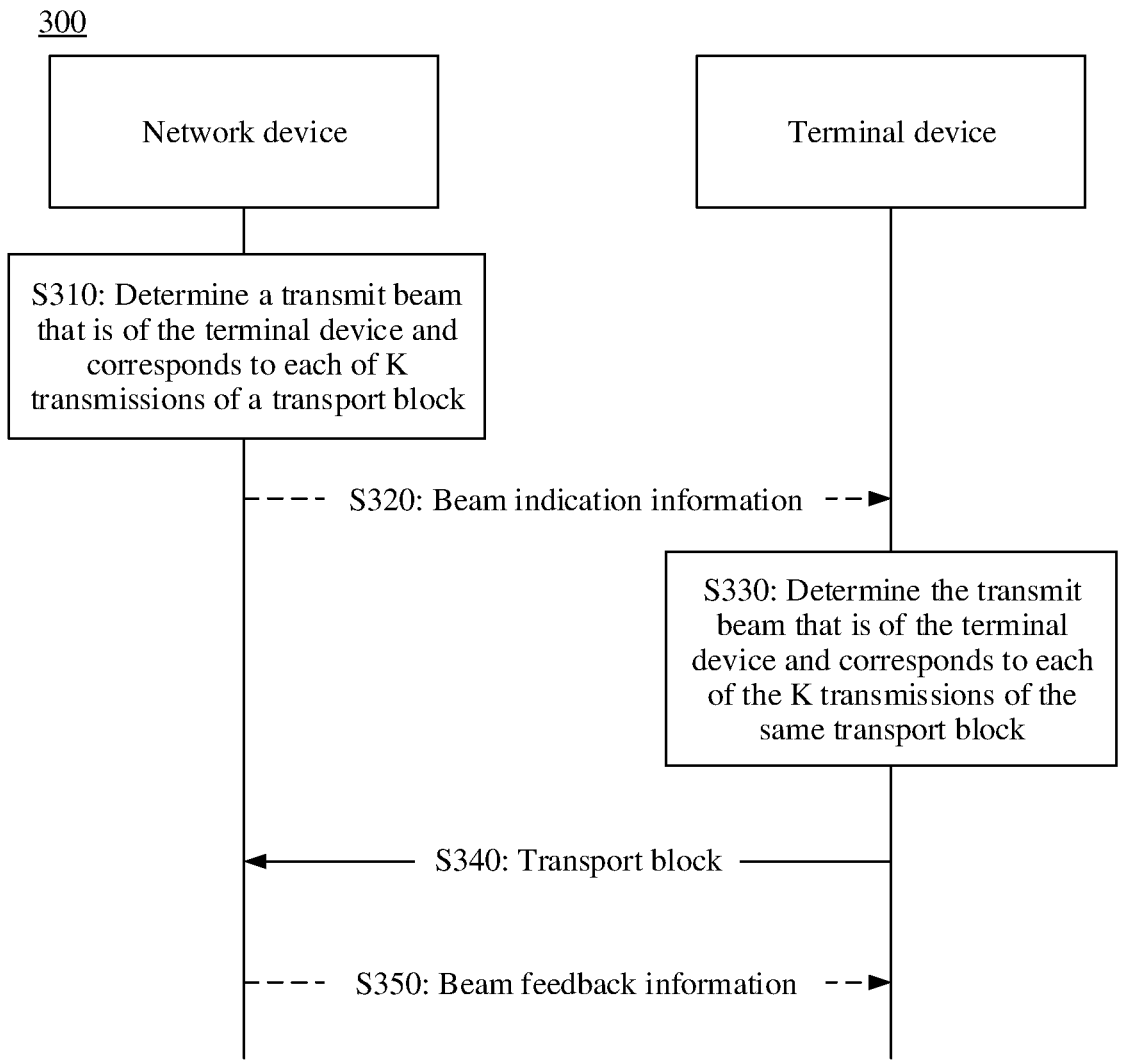
FIG. 3 is a schematic diagram of a repeated transmission method according to an embodiment of this application.

FIG. 3 is a schematic flowchart of a repeated transmission method 300 according to an embodiment of this application. As shown in FIG. 3, the method 300 mainly includes S310, S330, and S340. The method 300 may further include optional steps S320 and S350. The method shown in FIG. 3 may be applied to uplink communication.

S310: A network device determines a receive beam that is of the network device and corresponds to each of K transmissions of a same transport block. Alternatively, the network device determines a transmit beam that is of a terminal device and corresponds to each of the K transmissions of the same transport block.

Transmit beams that are of the terminal device and correspond to at least two of the K transmissions are different, and K is an integer greater than 1. In other words, the transmit beams that are of the terminal device and correspond to the K transmissions are not completely the same. It may be understood that the receive beams that are of the network device and correspond to the K transmissions are in a one-to-one correspondence with the transmit beams that are of the terminal device and correspond to the K transmissions. To be specific, in an $N^{th}$ (where N is any value in 1, 2, . . . , and K) transmission, a transmit beam used by the terminal device corresponds to a receive beam used by the network device. In other words, when the terminal device uses a transmit beam for sending, the network device uses a receive beam corresponding to the transmit beam for receiving. However, it should be understood that one beam of the terminal device may uniquely correspond to one receive beam of the network device, one transmit beam of the terminal device may correspond to a plurality of receive beams of the network device, or a plurality of transmit beams of the terminal device may correspond to one receive beam of the network device. This is not limited in this embodiment of this application.

It should be understood that, that the network device determines the receive beams of the network device may also be understood as that the network device determines the transmit beams of the terminal device.

It should be noted that, a "transport block" in uplink transmission is essentially an information bit stream needing to be sent by the terminal device to the network device, and may be an uplink reference signal, uplink user data, or control information such as uplink control information UCI. The UCI is borne in a PUSCH or a PUCCH. Specific content of the transport block is not limited in this embodiment of this application. It may be understood that the terminal device may repeatedly transmit the PUSCH, or may repeatedly transmit the PUCCH.

It should be understood that K may also be referred to as an aggregation factor, and a method for a plurality of transmissions of the same transport block by the terminal device may also be referred to as a slot aggregation method or a transmission time interval (TTI) bundling method.

Optionally, a receive beam that is of the network device and corresponds to each of the K transmissions may be predefined, may be specified in a protocol, or may be autonomously determined by the network device. Correspondingly, a transmit beam that is of the terminal device and corresponds to each of the K transmissions may be predefined, may be specified in a protocol, or may be configured by the network device.

S320: The network device sends beam indication information to the terminal device. The beam indication information is used to indicate the receive beam that is of the network device and corresponds to each transmission, or the beam indication information is used to indicate the transmit beam that is of the terminal device and corresponds to each transmission.

It should be understood that the terminal device communicates with the network device in a form of a beam, and that the network device determines the receive beams of the network device may also be understood as that the network device determines the transmit beams of the terminal device. In uplink transmission, the network device may notify the terminal device of the receive beams of the network device, or may notify the terminal device of the transmit beams of the terminal device. Therefore, that the beam indication information indicates the transmit beams of the terminal device and that the beam indication information indicates the receive beams of the network device are equivalent concepts. For the beam indication information, refer to the foregoing descriptions. For example, the beam indication information herein may be an index or identifier of a beam. This is not limited in this embodiment of this application.

Optionally, the beam indication information may be carried in transmission configuration information. The transmission configuration information may be RRC signaling, a MAC-CE, DCI, or a combination thereof.

For example, when the transport block is a PUSCH, the transmission configuration information may be RRC signaling, a MAC-CE, or DCI. Further, the beam indication information may be spatial relation information borne in an SRI domain (or field) in DCI. When the transport block is a PUCCH or UCI, the transmission configuration information may be RRC signaling, a MAC-CE, DCI, or a combination thereof. Further, the beam indication information is spatial relation information carried in RRC signaling or a MAC-CE.

For example, in this embodiment of this application, the transmission configuration information may further be used to indicate a quantity of repeated transmissions of the same transport block. In addition, the quantity of repeated transmissions of the same transport block may alternatively be pre-configured by the network device. For details, refer to the prior art. Details are not described herein.

For example, the transmission configuration information may be carried in multi-level DCI. For example, the network device notifies the terminal device that two-level DCI is to be used. One piece of first-level DCI carries information such as time-frequency resource locations of the K transmissions, and K pieces of second-level DCI carry beam indication information of the K transmissions. The K pieces of second-level DCI may be respectively sent in K slots.

It should be understood that K may also be referred to as an aggregation factor, and a method for a plurality of transmissions of the same transport block by the network device may also be referred to as a slot aggregation method or a transmission time interval (TTI) bundling method.

S330: The terminal device determines the transmit beam that is of the terminal device and corresponds to each of the K transmissions of the same transport block.

For example, the terminal device may determine, according to a predefined rule or a protocol specification, the transmit beam that is of the terminal device and corresponds to each transmission.

Optionally, if receiving the beam indication information sent by the network device in S320, the terminal device determines, based on the beam indication information, the transmit beam that is of the terminal device and corresponds to each transmission. Specifically, the beam indication information may directly indicate the receive beams of the network device. In this case, the terminal device may first determine the receive beams of the network device based on the beam indication information, and then determine the transmit beams of the terminal device based on the receive beams of the network device. Alternatively, the beam indication information may directly indicate the transmit beams of the terminal device, so that the terminal device may directly determine the transmit beams of the terminal device based on the beam indication information.

It should be understood that, that the terminal device determines the transmit beams of the terminal device may also be understood as that the terminal device determines the receive beams of the network device.

S340: The terminal device sends the transport block based on the transmit beam that is of the terminal device and corresponds to each transmission. Correspondingly, the network device receives the transport block based on the receive beam that is of the network device and corresponds to each transmission.

Specifically, the terminal device may repeatedly transmit the same transport block for K times, and use different transmit beams in at least two of the K transmissions. For example, K=4. The terminal device may respectively use four different transmit beams to perform four transmissions. Alternatively, the terminal device may use a same transmit beam #C in two of the four transmissions, and use other two transmit beams different from the transmit beam #C in the other two of the four transmissions. Alternatively, the terminal device may use a transmit beam #C in one of the four transmissions, and use a transmit beam #D different from the transmit beam #C in the other three of the four transmissions. Correspondingly, in each transmission, the network device uses a receive beam corresponding to a transmit beam of the terminal device to perform receiving.

It should be understood that, in this embodiment of this application, the K transmissions may be performed in K consecutive slots, or may be performed in K inconsecutive slots. This is not limited in this embodiment of this application. In addition, in the K transmissions, same time-frequency resources in the K slots may be used, or different time-frequency resources in the K slots may be used. Time-frequency resources used in the K transmissions are not limited in this embodiment of this application.

In the prior art, a same transmit beam is used for a plurality of transmissions of the same transport block. Consequently, communication may fail due to a cause such as beam blocking. According to the repeated transmission method in this embodiment of this application, the terminal device uses different transmit beams in at least two of a plurality of transmissions, so that a probability of beam blocking can be reduced, thereby improving an uplink communication success rate.

Optionally, in a possible implementation of S330, the terminal device may determine, based on the received beam indication information and a mapping relationship (denoted as a first mapping relationship), the transmit beam that is of the terminal device and corresponds to each transmission.

Specifically, the network device may send beam indication information to the terminal device. After receiving the beam indication information, the terminal device may determine, based on the first mapping relationship, a transmit beam that is of the terminal device and corresponds to the beam indication information. The first mapping relationship may indicate a correspondence between the beam indication information and the transmit beams of the terminal device. Alternatively, the first mapping relationship is a correspondence between the beam indication information and the transmit beams of the terminal device. Alternatively, the first mapping relationship is a correspondence between the beam indication information and the receive beams of the network device. Therefore, the terminal device may determine a receive beam of the network device based on the first mapping relationship and received beam indication information, and then may determine a transmit beam of the terminal device based on the receive beam of the network device. The first mapping relationship may be maintained by the terminal device autonomously or configured by the network device.

It may be understood that different beam indication information may correspond to different transmit beams of the terminal device. This is not limited in this embodiment of this application. For example, the terminal device may determine, based on the first mapping relationship, that transmit beams that are of the terminal device and correspond to beam indication information "000" are a receive beam #1 and a receive beam #2. This represents that the terminal device may perform sending for K times by using the transmit beam #1 and the transmit beam #2, according to a rule configured by the network device or a preset rule. For example, if K=4, the terminal device may perform sending for four times by using the transmit beam #1, the transmit beam #2, the transmit beam #1, and the transmit beam #2 sequentially, or the terminal device may perform sending for four times by using the transmit beam #1, the transmit beam #1, the transmit beam #2, and the transmit beam #2 sequentially.

Further, the terminal device determines, based on the first mapping relationship, the transmit beam that is of the terminal device and corresponds to each transmission only when the terminal device determines that a quantity K of the transmissions is greater than 1 and/or determines that the transmit beams that are of the terminal device and correspond to the K transmissions are not completely the same.

In addition, when the terminal device determines that the quantity of the transmissions is 1, or K>1 and transmit beams corresponding to a plurality of transmissions of the same transport block are a same transmit beam, the terminal device determines, based on a second mapping relationship, a transmit beam used by the terminal device. The second mapping relationship may indicate a correspondence between the beam indication information and the transmit beams of the terminal device. Alternatively, the second mapping relationship is a correspondence between the beam indication information and the transmit beams of the terminal device. Alternatively, the second mapping relationship is a correspondence between the beam indication information and the receive beams of the network device. Therefore, the terminal device may determine a receive beam of the network device based on the second mapping relationship and received beam indication information, and then may determine a transmit beam of the terminal device based on the receive beam of the network device. It may be understood that the first mapping relationship is different from the second mapping relationship. In different scenarios, for example, when quantities of repeated transmissions are different, same beam indication information may correspond to different receive beams.

For example, Table 2 shows a correspondence between the beam indication information and the transmit beams of the terminal device. A correspondence between beam indication information shown in the first column and a transmit beam of the terminal device shown in the second column is the second mapping relationship. A correspondence between the beam indication information shown in the first column and a transmit beam of the terminal device shown in the third column is the first mapping relationship.

TABLE 2

| Beam indication information, namely, an uplink beam indication field in DCI | Corresponding SpatialRelationInfo or identifier of a transmit beam of the terminal device | Corresponding SpatialRelationInfo list or identifier of a transmit beam of the terminal device |
|---|---|---|
| 000 | SpatialRelationInfo 1 (or transmit beam 1 of the terminal device) | SpatialRelationInfo {1, 2} (or transmit beams 1 and 2 of the terminal device) |
| 001 | SpatialRelationInfo 2 (or transmit beam 2 of the terminal device) | SpatialRelationInfo {1, 2, 3} (or transmit beams 1, 2, and 3 of the terminal device) |
| ... | ... | ... |

TABLE 2-continued

| Beam indication information, namely, an uplink beam indication field in DCI | Corresponding SpatialRelationInfo or identifier of a transmit beam of the terminal device | Corresponding SpatialRelationInfo list or identifier of a transmit beam of the terminal device |
| --- | --- | --- |
| 111 | SpatialRelationInfo 8 (or transmit beam 8 of the terminal device) | SpatialRelationInfo {1, 2, 4} (or transmit beams 1, 2, and 4 of the terminal device) |

Based on the foregoing descriptions, because K is greater than 1, the terminal device may determine, in the third column in Table 2, a transmit beam corresponding to beam indication information received by the terminal device. For example, if the beam indication information received by the terminal device is "111", the terminal device may determine that corresponding transmit beams are the transmit beam #1, the transmit beam #2, and a transmit beam #4. For example, if K=4, the terminal device may use the transmit beam #1 in the first transmission to send the transport block to the network device, use the transmit beam #2 in the second transmission to send the transport block to the network device, use the transmit beam #4 in the third transmission to send the transport block to the network device, and use the transmit beam #1 in the fourth transmission to send the transport block to the network device. It should be understood that, if a quantity of transmissions of a transport block is 1, or if the terminal device determines that transmit beams that are of the terminal device and correspond to a plurality of transmissions of a transport block are the same, the terminal device may determine, in the second column in Table 2, a transmit beam corresponding to the beam indication information received by the terminal device. For example, when K=4, the terminal device determines that transmit beams that are of the terminal device and correspond to a plurality of transmissions of a transport block are the same, and the beam indication information received by the terminal device is "111", the terminal device will use the transmit beam #8 to perform sending for four times.

It should be understood that SpatialRelationInfo is the spatial relation information described above.

It should be understood that the first mapping relationship and the second mapping relationship may be pre-configured by the network device, or may be specified in a protocol. This is not limited in this embodiment of this application. For example, the network device may configure the first mapping relationship and the second mapping relationship by using RRC signaling, a MAC-CE, or a combination thereof.

Optionally, in this embodiment of this application, the terminal device may determine, based on indication information #1, whether a plurality of transmissions of the same transport block correspond to a same transmit beam of the terminal device.

Specifically, the network device may send the indication information #1 to the terminal device. The terminal device may first determine, based on the indication information #1, whether a plurality of repeated transmissions of the same transport block correspond to a same transmit beam, and then determine, based on a determining result, whether to determine a transmit beam based on the first mapping relationship or determine a transmit beam based on the second mapping relationship. For example, the indication information #1 may be information that is borne in an indication field #A and used to indicate whether a plurality of transmissions of the same transport block correspond to a same transmit beam of the terminal device. The indication field #A may include one bit. If the bit is 0, it may represent that the plurality of transmissions of the same transport block correspond to a same transmit beam of the terminal device. If the bit is 1, it may represent that transmit beams that are of the terminal device and correspond to the plurality of transmissions of the same transport block are not completely the same. Therefore, the terminal device may determine, based on the information borne in the indication field #A, whether the plurality of transmissions of the same transport block correspond to a same transmit beam of the terminal device. It should be understood that a quantity of bits occupied by the indication field #A is not limited in this embodiment of this application, and a specific meaning represented by the bit being 0 or 1 is not limited either.

It should be understood that the indication information #1 may be carried in the transmission configuration information. This is not limited in this embodiment of this application. For example, the transmission configuration information may be RRC signaling, and the indication information #1 may be carried in DCI.

Optionally, in an embodiment of this application, the method may further include: The network device sends indication information #2 (namely, first indication information) to the terminal device. Correspondingly, the terminal device receives the indication information #2 sent by the network device. The indication information #2 is used to indicate a quantity of bits occupied by ACK information and/or NACK information. For example, the quantity of bits occupied by the ACK information and/or the NACK information may be determined by using a function related to K, for example, K, $\log_2 K$, $\log_2 (K+1)$, or K+1. This is not limited in this embodiment of this application.

Optionally, in an embodiment of this application, the method may further include: The network device sends indication information #3 (namely, second indication information) to the terminal device. Correspondingly, the terminal device receives the indication information #3 sent by the network device. The indication information #3 is used to indicate a redundancy version used for each transmission or used to indicate whether redundancy versions used for the K transmissions are the same.

For example, when a configuration of the redundancy versions does not match the quantity of repeated transmissions, that is, when a quantity of redundancy versions corresponding to the K transmissions is not equal to K, the terminal device may truncate or repeat the redundancy versions. For example, the second indication information is 0213. If K=4, the terminal device considers that the redundancy versions of the four repeated transmissions are a version 0, a version 2, a version 1, and a version 3 in sequence. If K=2, the terminal device considers that the redundancy versions of the two repeated transmissions are the version 0 and the version 2 in sequence. If K=8, the terminal device considers that the redundancy versions of the eight repeated transmissions are the version 0, the version 2, the version 1, the version 3, the version 0, the version 2, the version 1, and the version 3 in sequence.

It should be understood that the indication information #2 and the indication information #3 may be carried in the transmission configuration information. This is not limited in this embodiment of this application. For example, the transmission configuration information may be RRC signaling, and the indication information #2 and the indication information #3 may be carried in DCI.

Optionally, in an embodiment of this application, the method may further include:

S350: The network device sends beam feedback information to the terminal device based on a measurement result of receive quality of each transmission.

The beam feedback information is used to indicate one or more transmit beams, or the beam feedback information is used to indicate one or more slots corresponding to the one or more transmit beams. The one or more transmit beams are a portion or all of the transmit beams that are of the terminal device and correspond to the K transmissions, and receive quality of the one or more transmit beams is greater than or less than that of another transmit beam that is other than the one or more transmit beams and in the transmit beams that are of the terminal device and correspond to the K transmissions.

Optionally, the receive quality may be one or more of the following: RSRP, an RSSI, RSRP, an SINR, or a CQI.

Specifically, the network device may measure signal quality of data on a transmit beam corresponding to each transmission or signal quality of a demodulation reference signal on a transmit beam corresponding to each transmission, for example, RSRP or an SINR, to determine a transmit beam with relatively good signal quality or a transmit beam with relatively poor signal quality based on measurement results. Then, the network device may feed back the transmit beam with relatively good signal quality or a slot corresponding to the transmit beam with relatively good signal quality to the terminal device. In this way, the terminal device may use the transmit beam with relatively good signal quality in next transmission based on the feedback of the network device, to improve a transmission success rate. Alternatively, the network device may feed back the transmit beam with relatively poor signal quality or a slot corresponding to the transmit beam with relatively poor signal quality to the terminal device. In this way, the terminal device may avoid, based on the feedback of the network device, using the transmit beam with relatively poor signal quality in next transmission, to improve a transmission success rate.

It should be understood that the beam feedback information may alternatively indicate a portion or all of the receive beams that are of the network device and correspond to the K transmissions, and receive quality of the portion or all of the receive beams is greater than or less than that of another receive beam that is other than the one or more receive beams and in the receive beams that are of the network device and correspond to the K transmissions.

For example, the transmit beam with relatively good signal quality may be a transmit beam whose corresponding signal quality (for example, RSRP or SINR) is greater than or equal to a signal quality threshold, or may be one transmit beam with best signal quality or several transmit beams with relatively good signal quality in the at least two transmit beams corresponding to the K transmissions. Optionally, the signal quality threshold may be predefined, or autonomously determined by the network device based on a capability of the network device.

For example, the beam feedback information may be an index of a transmit beam of the terminal device, a relative index of a transmit beam of the terminal device, or a bitmap. Alternatively, the beam feedback information may be an index of a slot, a relative index of a slot, or a bitmap. For example, if the beam feedback information is a bitmap "1100", it represents that measurement results of receive beams corresponding to the first transmission and the second transmission in the four transmissions are better.

Further, S350 may be performed when the network device fails to decode the transport block sent by the terminal device. In addition, in this case, the network device may further feed back NACK information to the terminal device, to notify the terminal device that the network device fails to decode the transport block. After receiving the NACK information, the terminal device may retransmit the transport block.

It should be understood that, in this embodiment of this application, the network device may combine signals received in different slots and then perform decoding, or may separately decode a signal received in each slot.

In a possible implementation, the network device may first perform an operation on the beam feedback information and the NACK information, and then feed back an operation result to the terminal device. For example, the operation may be a modulo-2 addition operation, an exclusive OR operation, or the like. This is not limited in this embodiment of this application. Alternatively, the network device performs the foregoing operation on the beam feedback information and a mask of the NACK information, and then sends a result of the operation.

In addition, S350 may alternatively be performed when the network device successfully decodes the transport block sent by the terminal device. In addition, in this case, the network device may further feed back ACK information to the terminal device, to notify the terminal device that the network device successfully decodes the transport block. It should be understood that, for a manner in which the network device feeds back the ACK information and the beam feedback information, refer to the manner in which the network device feeds back the NACK information and the beam feedback information. Details are not described herein again.

Optionally, in an embodiment of this application, if the network device successfully decodes the transport block, when feeding back the ACK information to the terminal device, the network device may simultaneously feed back, to the terminal device, at least one of a quantity M of repeated transmissions required by the network device and a transmit beam expected by the network device; or simultaneously feed back, to the terminal device, at least one of a quantity M of repeated transmissions required by the network device and a receive beam expected by the network device. M is an integer less than or equal to K, the expected transmit beam belongs to the transmit beams that are of the terminal device and correspond to the K transmissions, and the expected receive beam belongs to the receive beams that are of the network device and correspond to the K transmissions.

For example, in S340, when attempting to combine signals received in different slots and then perform decoding, the network device finds that successful decoding requires only signals in the $0^{th}$ slot and the $2^{nd}$ slot. In this case, the network device may feed back ACK+ (1010) to the terminal device. The terminal device may adjust scheduling based on information fed back by the network device. For example, the terminal device reduces the quantity of repeated transmissions to 2, and performs repeated transmissions on a transmit beam corresponding to the $0^{th}$ slot and a transmit beam corresponding to the $2^{nd}$ slot.

Optionally, in an embodiment of this application, the terminal device may determine a transmit beam with a lowest (or smallest) beam index in the one or more expected transmit beams as a default transmit beam. Correspondingly, the network device may determine the receive beam with the lowest beam index in the one or more expected receive beams as a default receive beam.

Optionally, in an embodiment of this application, the terminal device may determine a transmit beam with a lowest (or smallest) beam index in the transmit beams that are of the terminal device and correspond to the K transmissions as a default transmit beam. Correspondingly, the network device may determine the receive beam with the lowest beam index in the receive beams that are of the network device and correspond to the K transmissions as a default receive beam.

It may be understood that the default receive beam is used to receive the transport block. The default transmit beam is used to send the transport block. For a possible form of the transport block, refer to the foregoing descriptions. Details are not described herein again.

Specifically, in some scenarios, for example, when a low-latency service is transmitted, the terminal device may directly use the default transmit beam for transmission. Correspondingly, the network device uses the default receive beam for receiving. Generally, the default transmit beam is a beam used by the terminal device to send a PUCCH. When the terminal device uses at least two transmit beams to repeatedly transmit the PUCCH, because a beam for sending the PUCCH is not unique, a default beam needs to be redefined. In this application, a transmit beam with a lowest beam index in the at least two transmit beams for sending the PUCCH may be used as the default transmit beam. Alternatively, a transmit beam with a lowest beam index in several transmit beams that have relatively good receive quality and that are in the at least two transmit beams that are fed back by the network device and used to send the PUCCH is used as the default transmit beam.

The foregoing describes in detail examples of the repeated transmission method provided in this application. It may be understood that to implement the foregoing functions, the terminal device and the network device each include a corresponding hardware structure and/or software module for performing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this application.

Figure 4:
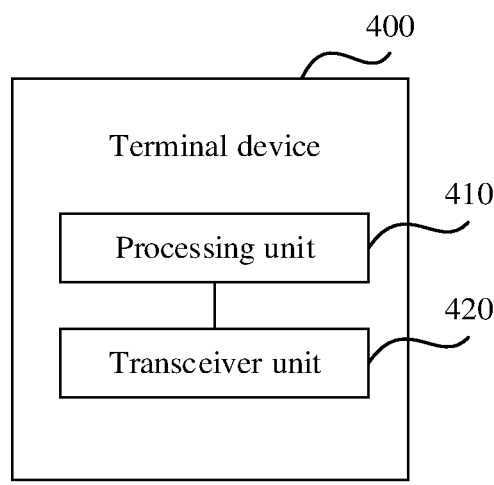
FIG. 4 is a schematic structural diagram of a communications apparatus according to this application.

FIG. 4 is a schematic structural diagram of a communications apparatus 400 according to this application. The communications apparatus 400 includes a processing unit 410 and a transceiver unit 420.

The processing unit 410 is configured to determine a receive beam that is of the communications apparatus and corresponds to each of K transmissions of a same transport block. The receive beams that are of the communications apparatus and correspond to the K transmissions are in a one-to-one correspondence with transmit beams that are of the second communications apparatus and correspond to the K transmissions, transmit beams that are of the second communications apparatus and correspond to at least two of the K transmissions are different, and K is an integer greater than 1.

The transceiver unit 420 is configured to receive the transport block based on the receive beam that is of the communications apparatus and corresponds to each transmission.

The communications apparatus 400 is a communications device, or may be a chip inside a communications device. When the communications apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the foregoing methods. When the communications apparatus is a chip inside a communications device, the processing unit may be a processor, and the transceiver unit may be an input/output interface, a pin, a circuit, or the like. The processing unit executes the instruction stored in the storage unit, to enable the communications apparatus to perform the operations performed by the terminal device in the method 200 or the operations performed by the network device in the method 300. The storage unit may be a storage unit (such as a register or a cache) inside the chip, or may be a storage unit (such as a read-only memory or a random access memory) inside the communications device and outside the chip.

A person skilled in the art may clearly understand that, for steps performed by the communications apparatus 400 and corresponding beneficial effects, refer to related descriptions of the terminal device in the method 200 or of the network device in the method 300. For brevity, details are not described herein again.

Figure 5:
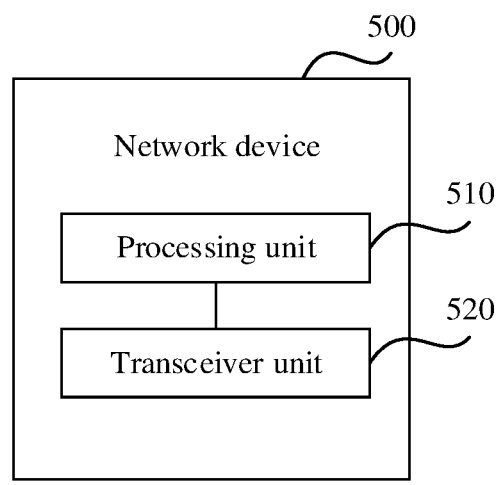
FIG. 5 is a schematic structural diagram of a communications apparatus according to this application.

FIG. 5 is a schematic structural diagram of a communications apparatus 500 according to this application. The communications apparatus 500 includes a processing unit 510 and a transceiver unit 520.

The processing unit 510 is configured to determine a transmit beam that is of the communications apparatus and corresponds to each of K transmissions of a same transport block. Transmit beams that are of the communications apparatus and correspond to at least two of the K transmissions are different, and K is an integer greater than 1.

The transceiver unit 520 is configured to send the transport block based on the transmit beam that is of the communications apparatus and corresponds to each transmission.

The communications apparatus 500 is a communications device, or may be a chip inside a communications device. When the communications apparatus is a communications device, the processing unit may be a processor, and the transceiver unit may be a transceiver. The communications device may further include a storage unit, and the storage unit may be a memory. The storage unit is configured to store an instruction, and the processing unit executes the instruction stored in the storage unit, to enable the communications device to perform the foregoing methods. When the apparatus is a chip inside a communications device, the processing unit may be a processor, and the transceiver unit may be an input/output interface, a pin, a circuit, or the like. The processing unit executes the instruction stored in the storage unit, to enable the communications apparatus to perform the operations performed by the network device in the method 200 or the operations performed by the terminal device in the method 300. The storage unit may be a storage unit (such as a register or a cache) inside the chip, or may be a storage unit (such as a read-only memory or a random access memory) inside the communications device and outside the chip.

A person skilled in the art may clearly understand that, for steps performed by the communications apparatus 500 and corresponding beneficial effects, refer to related descriptions of the network device in the method 200 or of the terminal device in the method 300. For brevity, details are not described herein again.

The communications apparatus in the foregoing apparatus embodiments completely correspond to the terminal device or network device in the method embodiments. A corresponding module or unit performs a corresponding step. For example, a transceiver unit (a transceiver) performs sending and/or receiving steps in the method embodiments, and a processing unit (a processor) performs another step other than the sending and receiving steps. For a function of a specific unit, refer to a corresponding method embodiment. A sending unit and a receiving unit may form a transceiver unit, and a transmitter and a receiver may form a transceiver, to jointly implement receiving and sending functions. There may be one or more processors.

It should be understood that division into the foregoing units is merely function division, and may be other division in an actual implementation.

The foregoing terminal device or network device may be a chip. A processing unit may be implemented by using hardware, or may be implemented by using software. When being implemented by using hardware, the processing unit may be a logic circuit, an integrated circuit, or the like. When being implemented by using software, the processing unit may be a general-purpose processor, and is implemented by reading software code stored in a memory. The memory may be integrated into the processor, or may exist independently outside the processor.

Figure 6:
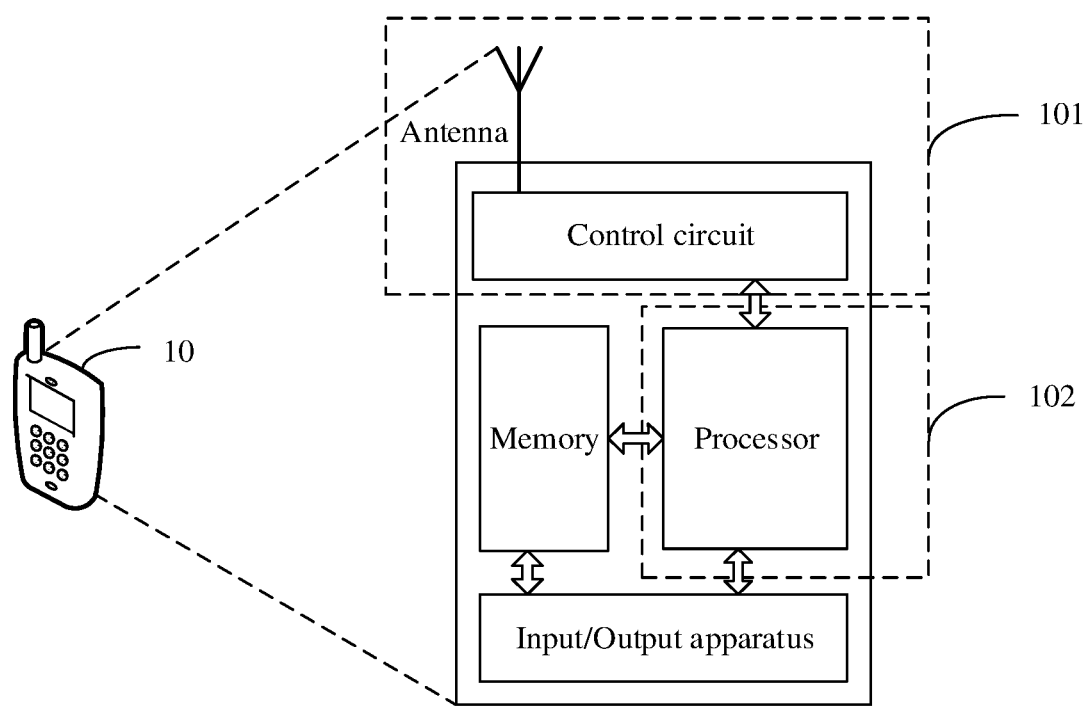
FIG. 6 is a schematic structural diagram of a terminal device according to this application.

FIG. 6 is a schematic structural diagram of a terminal device 10 according to this application. For ease of description, FIG. 6 shows only main parts of the terminal device. As shown in FIG. 6, the terminal device 10 includes a processor, a memory, a control circuit, an antenna, and an input/output apparatus.

The processor is mainly configured to: process a communication protocol and communication data; control the entire terminal device; execute a software program; and process data of the software program. For example, the processor is configured to support the terminal device in performing an action described in the foregoing embodiments of the repeated transmission method. The memory is mainly configured to store the software program and the data. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data entered by a user and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 6 shows only one memory and one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 6 integrates functions of the baseband processor and the central processing unit. The person skilled in the art may understand that, alternatively, the baseband processor and the central processing unit may be independent processors, and interconnected by using a technology such as a bus. The person skilled in the art may understand that the terminal device may include a plurality of baseband processors to adapt to different network standards, the terminal device may include a plurality of central processing units to improve a processing capability of the terminal device, and parts of the terminal device may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of this application, the antenna and the control circuit that have receiving and sending functions may be considered as a transceiver unit 101 of the terminal device 10, and the processor having a processing function may be considered as a processing unit 102 of the terminal device 10. As shown in FIG. 6, the terminal device 10 includes the transceiver unit 101 and the processing unit 102. The transceiver unit may also be referred to as a transceiver, a transceiver machine, a transceiver apparatus, or the like. Optionally, a component that is in the transceiver unit 101 and configured to implement a receiving function may be considered as a receiving unit, and a component that is in the transceiver unit 101 and configured to implement a sending function may be considered as a sending unit. In other words, the transceiver unit 101 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like.

The terminal device shown in FIG. 6 may perform the actions performed by the terminal device in the foregoing methods. To avoid repetition, detailed descriptions thereof are omitted herein.

Figure 7:
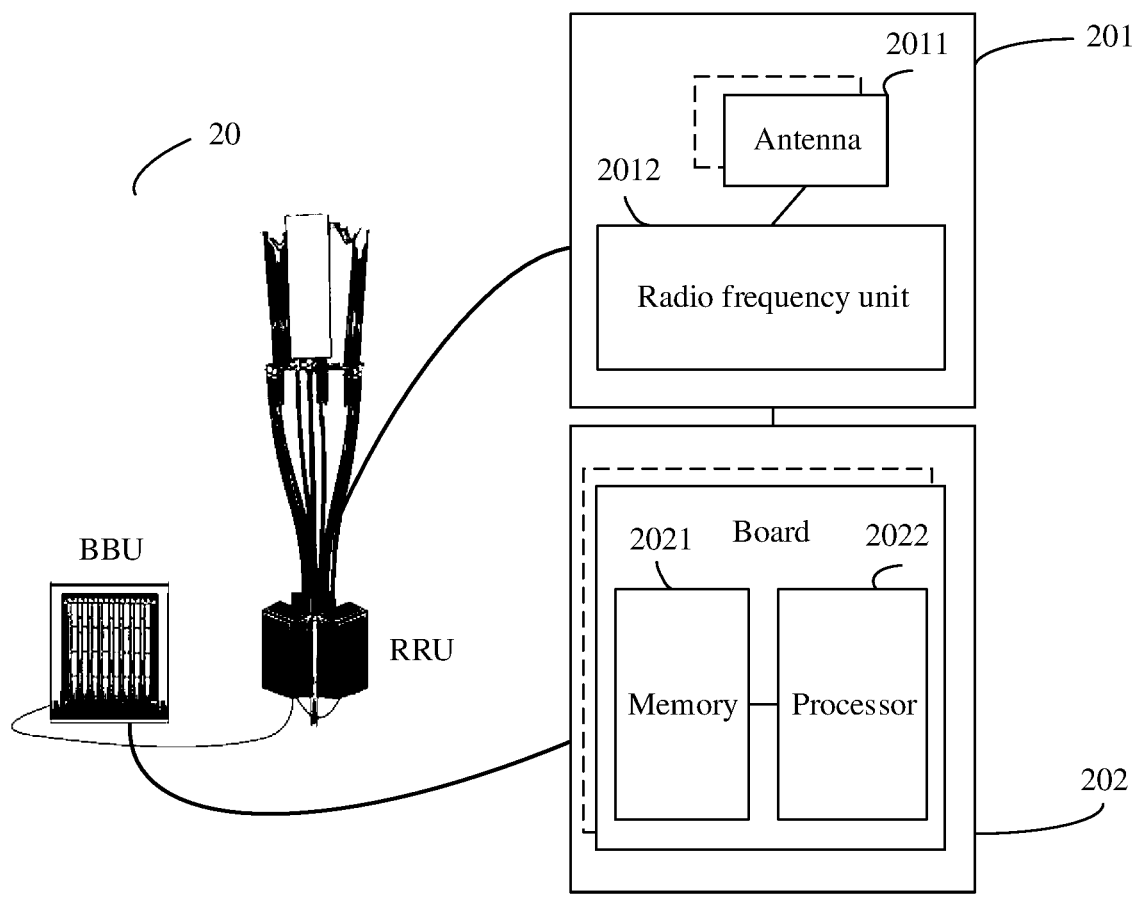
FIG. 7 is a schematic structural diagram of a network device according to this application.

FIG. 7 is a schematic structural diagram of a network device according to this application. The network device may be, for example, a base station 20. As shown in FIG. 7, the base station may be applied to the communications system shown in FIG. 1, to perform a function of the network device in the foregoing method embodiments. The base station 20 may include one or more radio frequency units such as a remote radio unit (RRU) 201 and one or more baseband units (BBU) (which may also be referred to as digital units (DU)) 202. The RRU 201 may be referred to as a transceiver unit, a transceiver, a transceiver circuit, a transceiver machine, or the like, and may include at least one antenna 2011 and a radio frequency unit 2012. The RRU 201 is mainly configured to: send and receive a radio frequency signal, and perform conversion between the radio frequency signal and a baseband signal, for example, configured to send the PDCCH and/or the PDSCH in the foregoing method embodiments. The BBU 202 is mainly configured to perform baseband processing, control the base station, and the like. The RRU 201 and the BBU 202 may be physically disposed together, or may be physically separated, that is, a distributed base station.

The BBU 202 is a control center of the base station, may be referred to as a processing unit, and is mainly configured to complete baseband processing functions such as channel coding, multiplexing, modulation, and spectrum spreading. For example, the BBU (the processing unit) 202 may be configured to control the base station to execute an operation procedure related to the network device in the foregoing method embodiments.

In an embodiment, the BBU 202 may include one or more boards, and a plurality of boards may jointly support a radio access network (such as an LTE network) having a single access standard, or may separately support radio access networks (for example, an LTE network, a 5G network, or another network) having different access standards. The BBU 202 further includes a memory 2021 and a processor 2022. The memory 2021 is configured to store a necessary instruction and necessary data. The processor 2022 is configured to control the base station to perform a necessary action, for example, configured to control the base station to perform an operation procedure related to the network device in the foregoing method embodiments. The memory 2021 and the processor 2022 may serve the one or more boards. In other words, the memory and the processor may be independently disposed on each board. Alternatively, the plurality of boards may share a same memory and a same processor. In addition, each board may further be provided with a necessary circuit.

This application further provides a communications system, including the foregoing one or more network devices and one or more terminal devices.

It should be noted that, the processor in the embodiments of this application may be an integrated circuit chip, and has a signal processing capability. In an implementation process, the steps in the foregoing method embodiments may be completed through a hardware integrated logical circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or may be any conventional processor or the like. The steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through descriptions of the examples but not limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

This application further provides a computer-readable medium. The computer-readable medium stores a computer program. When the computer program is executed by a computer, a function in any one of the foregoing method embodiments is implemented.

This application further provides a computer program product. When the computer program product is executed by a computer, a function in any one of the foregoing method embodiments is implemented.

To help readers understand this application, the following further lists some embodiments of the method and apparatus provided in this application. For related parts in the following embodiments and the foregoing embodiments, mutual reference may be made for understanding.

Embodiment 1: A repeated transmission method includes:
determining, by a first communications apparatus, a receive beam that is of the first communications apparatus and corresponds to each of K transmissions of a same transport block, where the receive beams that are of the first communications apparatus and correspond to the K transmissions are in a one-to-one correspondence with transmit beams that are of the second communications apparatus and correspond to the K transmissions, transmit beams that are of the second communications apparatus and correspond to at least two of the K transmissions are different, and K is an integer greater than 1; and
receiving, by the first communications apparatus, the transport block based on the receive beam that is of the first communications apparatus and corresponds to each transmission.

Embodiment 2: In the method according to Embodiment 1, the method further includes:
sending, by the first communications apparatus, beam feedback information to the second communications apparatus based on a measurement result of receive quality of each transmission, where the beam feedback information is used to indicate one or more transmit beams, or the beam feedback information is used to indicate one or more slots corresponding to the one or more transmit beams, where the one or more transmit beams are a portion or all of the transmit beams that are of the second communications apparatus and correspond to the K transmissions, and receive quality of the one or more transmit beams is greater than or less than that of another transmit beam that is other than the one or more transmit beams and in the transmit beams that are of the second communications apparatus and correspond to the K transmissions.

Embodiment 3: In the method according to Embodiment 2, the sending, by the first communications apparatus, beam feedback information to the second communications apparatus based on a measurement result of receive quality of each transmission includes:
if failing to decode the transport block after the K transmissions, sending, by the first communications apparatus, the beam feedback information and negative acknowledgment (NACK) information to the second communications apparatus.

Embodiment 4: In the method according to any one of Embodiments 1 to 3, the method further includes:
if successfully decoding the transport block after the K transmissions, sending, by the first communications apparatus to the second communications apparatus, acknowledgment (ACK) information and at least one of an expected transmit beam and a quantity M of repeated transmissions required by the first communications apparatus, where M is an integer less than or equal to K, and the expected transmit beam belongs to the transmit beams that are of the second communications apparatus and correspond to the K transmissions.

Embodiment 5: In the method according to Embodiment 4, the method further includes:
determining, by the first communications apparatus, a receive beam corresponding to a transmit beam with a lowest beam index in the one or more expected transmit beams as a default receive beam, where the default receive beam is used to receive the transport block.

Embodiment 6: In the method according to any one of Embodiments 1 to 5, the method further includes:
determining, by the first communications apparatus, a receive beam corresponding to a transmit beam with a lowest beam index in the transmit beams that are of the second communications apparatus and correspond to the K transmissions as a default receive beam, where the default receive beam is used to receive the transport block.

Embodiment 7: In the method according to any one of Embodiments 1 to 6, when the first communications apparatus is a terminal device, and the second communications apparatus is a network device, the determining, by a first communications apparatus, a receive beam that is of the first communications apparatus and corresponds to each of K transmissions of a same transport block includes:
receiving, by the first communications apparatus, beam indication information sent by the second communications apparatus, where the beam indication information is used to indicate the transmit beams that are of the second communications apparatus and correspond to the K transmissions; and
determining, by the first communications apparatus based on the beam indication information, the receive beam that is of the first communications apparatus and corresponds to each transmission.

Embodiment 8: In the method according to Embodiment 7, the method further includes:
receiving, by the first communications apparatus, at least one of first indication information and second indication information that are sent by the second communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 9: In the method according to any one of Embodiments 1 to 6, when the first communications apparatus is a network device, and the second communications apparatus is a terminal device, after the determining, by a first communications apparatus, a receive beam that is of the first communications apparatus and corresponds to each of K transmissions of a same transport block, the method further includes:
sending, by the first communications apparatus, beam indication information to the second communications apparatus, where the beam indication information is used to indicate the receive beam that is of the first communications apparatus and corresponds to each transmission or indicate the transmit beam that is of the second communications apparatus and corresponds to each transmission.

Embodiment 10: In the method according to Embodiment 9, the method further includes:
sending, by the first communications apparatus, at least one of first indication information and second indication information to the second communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 11: In the method according to Embodiment 8 or 10, the quantity of bits is K, $\log_2 K$, or K+1.

Embodiment 12: A repeated transmission method includes:
determining, by a second communications apparatus, a transmit beam that is of the second communications apparatus and corresponds to each of K transmissions of a same transport block, where transmit beams that are of the second communications apparatus and correspond to at least two of the K transmissions are different, and K is an integer greater than 1; and
sending, by the second communications apparatus, the transport block based on the transmit beam that is of the second communications apparatus and corresponds to each transmission.

Embodiment 13: In the method according to Embodiment 12, the method further includes:
receiving, by the second communications apparatus, beam feedback information, where the beam feedback information is used to indicate one or more transmit beams, or the beam feedback information is used to indicate one or more slots corresponding to the one or more transmit beams, where the one or more transmit beams are a portion or all of the transmit beams that are of the second communications apparatus and correspond to the K transmissions, and receive quality of the one or more transmit beams is greater than or less than that of another transmit beam that is other than the one or more transmit beams and in the transmit beams that are of the second communications apparatus and correspond to the K transmissions.

Embodiment 14: In the method according to Embodiment 13, the receiving, by the second communications apparatus, beam feedback information includes:

receiving, by the second communications apparatus, the beam feedback information when receiving negative acknowledgment (NACK) information, where the NACK information is used to indicate that a first communications apparatus successfully decodes the transport block.

Embodiment 15: In the method according to any one of Embodiments 12 to 14, the method further includes:

receiving, by the second communications apparatus, acknowledgment (ACK) information and at least one of an expected transmit beam and a quantity M of repeated transmissions required by the first communications apparatus, where M is an integer less than or equal to K, the expected transmit beam belongs to the transmit beams that are of the second communications apparatus and correspond to the K transmissions, and the ACK information is used to indicate that the first communications apparatus successfully decodes the transport block.

Embodiment 16: In the method according to Embodiment 15, the method further includes:

determining, by the second communications apparatus, a transmit beam with a lowest beam index in the one or more expected transmit beams as a default transmit beam, where the default transmit beam is used to send the transport block.

Embodiment 17: In the method according to any one of Embodiments 12 to 16, the method further includes:

determining, by the second communications apparatus, a transmit beam with a lowest beam index in the transmit beams that are of the second communications apparatus and correspond to the K transmissions as a default transmit beam, where the default transmit beam is used to send the transport block.

Embodiment 18: In the method according to any one of Embodiments 12 to 17, when the second communications apparatus is a network device, and the first communications apparatus is a terminal device, before the sending, by the second communications apparatus, the transport block based on the transmit beam that is of the second communications apparatus and corresponds to each transmission, the method further includes:

sending, by the second communications apparatus, transmit beam indication information to the first communications apparatus, where the beam indication information is used to indicate the transmit beams that are of the second communications apparatus and correspond to the K transmissions.

Embodiment 19: In the method according to Embodiment 18, the method further includes:

sending, by the second communications apparatus, at least one of first indication information and second indication information to the first communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 20: In the method according to any one of Embodiments 12 to 17, when the second communications apparatus is a terminal device, and the first communications apparatus is a network device, the determining, by a second communications apparatus, a transmit beam that is of the second communications apparatus and corresponds to each of K transmissions of a same transport block includes:

receiving, by the second communications apparatus, beam indication information sent by the first communications apparatus; and determining, by the second communications apparatus based on the beam indication information, the transmit beam that is of the first communications apparatus and corresponds to each transmission, where the beam indication information is used to indicate the receive beam that is of the first communications apparatus and corresponds to each transmission or indicate the transmit beam that is of the second communications apparatus and corresponds to each transmission, and the transmit beams that are of the second communications apparatus and correspond to the K transmissions are in a one-to-one correspondence with the receive beams that are of the first communications apparatus and correspond to the K transmissions.

Embodiment 21: In the method according to Embodiment 20, the method further includes:

receiving, by the second communications apparatus, at least one of first indication information and second indication information that are sent by the first communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 22: In the method according to Embodiment 19 or 21, the quantity of bits is K, $\log_2$ K, or K+1.

Embodiment 23: A communications apparatus includes:

a processing unit, configured to determine a receive beam that is of the communications apparatus and corresponds to each of K transmissions of a same transport block, where the receive beams that are of the communications apparatus and correspond to the K transmissions are in a one-to-one correspondence with transmit beams that are of the second communications apparatus and correspond to the K transmissions, transmit beams that are of the second communications apparatus and correspond to at least two of the K transmissions are different, and K is an integer greater than 1; and a transceiver unit, configured to receive the transport block based on the receive beam that is of the communications apparatus and corresponds to each transmission.

Embodiment 24: In the communications apparatus according to Embodiment 23, the transceiver unit is further configured to:

send beam feedback information to the second communications apparatus based on a measurement result of receive quality of each transmission, where the beam feedback information is used to indicate one or more transmit beams, or the beam feedback information is used to indicate one or more slots corresponding to the one or more transmit beams, where the one or more transmit beams are a portion or all of the transmit beams that are of the second communications apparatus and correspond to the K transmissions, and receive quality of the one or more transmit beams is greater than or less than that of another transmit beam that is other than the one or more transmit beams and in the transmit beams that are of the second communications apparatus and correspond to the K transmissions.

Embodiment 25: In the communications apparatus according to Embodiment 24, the transceiver unit is specifically configured to:
  if the processing unit fails to decode the transport block after the K transmissions, send the beam feedback information and negative acknowledgment (NACK) information to the second communications apparatus.

Embodiment 26: In the communications apparatus according to any one of Embodiments 23 to 25, the transceiver unit is further configured to:
  if the processing unit successfully decodes the transport block after the K transmissions, send, to the second communications apparatus, acknowledgment (ACK) information and at least one of an expected transmit beam and a quantity M of repeated transmissions required by the communications apparatus, where M is an integer less than or equal to K, and the expected transmit beam belongs to the transmit beams that are of the second communications apparatus and correspond to the K transmissions.

Embodiment 27: In the communications apparatus according to Embodiment 26, the processing unit is further configured to:
  determine a receive beam corresponding to a transmit beam with a lowest beam index in the one or more expected transmit beams as a default receive beam, where the default receive beam is used to receive the transport block.

Embodiment 28: In the communications apparatus according to any one of Embodiments 23 to 27, the processing unit is further configured to:
  determine a receive beam corresponding to a transmit beam with a lowest beam index in the transmit beams that are of the second communications apparatus and correspond to the K transmissions as a default receive beam, where the default receive beam is used to receive the transport block.

Embodiment 29: In the communications apparatus according to any one of Embodiments 23 to 28, the transceiver unit is further configured to:
  receive beam indication information sent by the second communications apparatus, where the beam indication information is used to indicate the transmit beams that are of the second communications apparatus and correspond to the K transmissions; and
  the processing unit is specifically configured to determine, based on the beam indication information, the receive beam that is of the communications apparatus and corresponds to each transmission.

Embodiment 30: In the communications apparatus according to Embodiment 29, the transceiver unit is further configured to:
  receive at least one of first indication information and second indication information that are sent by the second communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 31: In the communications apparatus according to any one of Embodiments 23 to 28, the transceiver unit is further configured to:
  send beam indication information to the second communications apparatus, where the beam indication information is used to indicate the receive beam that is of the communications apparatus and corresponds to each transmission or indicate the transmit beam that is of the second communications apparatus and corresponds to each transmission.

Embodiment 32: In the communications apparatus according to Embodiment 31, the transceiver unit is further configured to:
  send at least one of first indication information and second indication information to the second communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 33: In the communications apparatus according to Embodiment 30 or 32, the quantity of bits is K, $\log_2 K$, or K+1.

Embodiment 34: A communications apparatus includes:
  a processing unit, configured to determine a transmit beam that is of the communications apparatus and corresponds to each of K transmissions of a same transport block, where transmit beams that are of the communications apparatus and correspond to at least two of the K transmissions are different, and K is an integer greater than 1; and
  a transceiver unit, configured to send the transport block based on the transmit beam that is of the communications apparatus and corresponds to each transmission.

Embodiment 35: In the communications apparatus according to Embodiment 34, the transceiver unit is further configured to:
  receive beam feedback information, where the beam feedback information is used to indicate one or more transmit beams, or the beam feedback information is used to indicate one or more slots corresponding to the one or more transmit beams, where the one or more transmit beams are a portion or all of the transmit beams that are of the communications apparatus and correspond to the K transmissions, and receive quality of the one or more transmit beams is greater than or less than that of another transmit beam that is other than the one or more transmit beams and in the transmit beams that are of the communications apparatus and correspond to the K transmissions.

Embodiment 36: In the communications apparatus according to Embodiment 35, the transceiver unit is specifically configured to:
  receive the beam feedback information when receiving negative acknowledgment (NACK) information, where the NACK information is used to indicate that a first communications apparatus successfully decodes the transport block.

Embodiment 37: In the communications apparatus according to any one of Embodiments 34 to 36, the transceiver unit is further configured to:
  receive acknowledgment (ACK) information and at least one of an expected transmit beam and a quantity M of repeated transmissions required by the first communications apparatus, where M is an integer less than or equal to K, the expected transmit beam belongs to the transmit beams that are of the communications apparatus and correspond to the K transmissions, and the ACK information is used to indicate that the first communications apparatus successfully decodes the transport block.

Embodiment 38: In the communications apparatus according to Embodiment 37, the processing unit is further configured to:

determine a transmit beam with a lowest beam index in the one or more expected transmit beams as a default transmit beam, where the default transmit beam is used to send the transport block.

Embodiment 39: In the communications apparatus according to any one of Embodiments 34 to 38, the processing unit is further configured to:

determine a transmit beam with a lowest beam index in the transmit beams that are of the communications apparatus and correspond to the K transmissions as a default transmit beam, where the default transmit beam is used to send the transport block.

Embodiment 40: In the communications apparatus according to any one of Embodiments 34 to 39, the transceiver unit is further configured to:

send beam indication information to the first communications apparatus, where the beam indication information is used to indicate the transmit beams that are of the communications apparatus and correspond to the K transmissions.

Embodiment 41: In the communications apparatus according to Embodiment 40, the transceiver unit is further configured to:

send at least one of first indication information and second indication information to the first communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 42: In the communications apparatus according to any one of Embodiments 34 to 39, the transceiver unit is further configured to:

receive beam indication information sent by the first communications apparatus; and the processing unit is specifically configured to determine, based on the beam indication information, the transmit beam that is of the first communications apparatus and corresponds to each transmission, where the beam indication information is used to indicate the receive beam that is of the first communications apparatus and corresponds to each transmission or indicate the transmit beam that is of the communications apparatus and corresponds to each transmission, and the transmit beams that are of the communications apparatus and correspond to the K transmissions are in a one-to-one correspondence with the receive beams that are of the first communications apparatus and correspond to the K transmissions.

Embodiment 43: In the communications apparatus according to Embodiment 42, the transceiver unit is further configured to:

receive at least one of first indication information and second indication information that are sent by the first communications apparatus, where the first indication information is used to indicate a quantity of bits occupied by acknowledgment (ACK) information and/or negative acknowledgment (NACK) information, and the second indication information is used to indicate a redundancy version used for each transmission.

Embodiment 44: In the communications apparatus according to Embodiment 41 or 43, the quantity of bits is K, $\log_2$ K, or K+1.

There is no clear correspondence between numbers of the foregoing embodiments and numbers of the embodiments described above, and the numbers are merely used for ease of description in this part.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that an "embodiment" mentioned in the entire specification means that particular characteristics, structures, or features related to the embodiment are included in at least one embodiment of this application. Therefore, the embodiments in the entire specification do not necessarily refer to a same embodiment. In addition, these particular characteristics, structures, or features may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

In addition, the terms "system" and "network" in this specification may be often used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, and C" may represent the following six cases: A exists alone, B exists alone, C exists alone, A and B coexist, B and C coexist, and A, B, and C coexist.

In this application, "at least one" means one or more, and "a plurality of" means two or more. The term "and/or" describes an association relationship for describing associated objects and represents that three relationships may exist. For example, A and/or B may represent: Only A exists, both A and B exist, and only B exists. A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one (one piece) of a, b, or c may represent: a, b, c, a-b, a-c, b-c, or a-b-c, where a, b, and c may be singular or plural.

It should be understood that in the embodiments of this application, "B corresponding to A" represents that B is associated with A, and B may be determined based on A. However, it should be further understood that determining B based on A does not mean that B is determined based on only A. B may alternatively be determined based on A and/or other information.

A person of ordinary skill in the art may be aware that, the units and steps in the examples described with reference to the embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. The person skilled in the art may use different methods to implement the described functions for each particular application, but it should not be considered that the implementation goes beyond the scope of this application.

With descriptions of the foregoing implementations, the person skilled in the art may clearly understand that this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communications medium, and the communications medium includes any medium that enables a computer program to be transmitted from one place to another place. The storage medium may be any available medium accessible by a computer. The following provides an example but does not impose a limitation: The computer-readable medium may include a RAM, a ROM, an EEPROM, a CD-ROM, another compact disc storage or magnetic disk storage medium, another magnetic storage device, or any other medium that can carry or store expected program code in a form of an instruction or a data structure and can be accessed by the computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. For example, a disk and a disc used in this application include a compact disc (CD), a laser disc, an optical disc, a digital versatile disc (DVD), a floppy disk, and a Blu-ray disc. The disk usually uses magnetism to copy data, and the disc uses lasers to copy data. The foregoing combination shall also be included in the protection scope of the computer-readable medium.

In summary, what is described above is merely an example of the embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A communications method, comprising:
receiving, from a network device, downlink control information (DCI) indicating two transmission configuration indicator (TCI) states; and
receiving, from the network device, at least four transmissions of a transport block (TB) by using the two TCI states based on a rule.

2. The method according to claim 1, wherein the DCI includes TCI field indicating the two TCI states.

3. The method according to claim 1, wherein the rule is one of a first rule or a second rule, and wherein:
according to the first rule, for every two consecutive transmissions of the at least four transmissions of the TB, receiving a first of the two consecutive transmissions by using a first TCI state of the two TCI states and receiving a second of the two consecutive transmissions by using a second TCI state of the two TCI states; and
according to the second rule, receiving every two consecutive transmissions of the at least four transmissions of the TB by using the first TCI state and the second TCI state alternatively.

4. The method according to claim 1, wherein same time-frequency resources in at least two slots are used for the at least four transmissions.

5. The method according to claim 1, further comprising:
receiving indication information indicating a redundancy version of the at least four transmissions and whether redundancy version of the at least four transmissions are same.

6. A communications apparatus, comprising:
at least one processor communicably coupled to one or more memories storing programming instructions for execution by the at least one processor, the programming instructions instructing the communications apparatus to:
receive, from a network device, downlink control information (DCI) indicating two transmission configuration indicator (TCI) states; and
receive, from the network device, at least four transmissions of a transport block (TB) by using the two TCI states based on a rule.

7. The communications apparatus according to claim 6, wherein the DCI includes TCI field indicating the two TCI states.

8. The communications apparatus according to claim 6, wherein the rule is one of a first rule or a second rule, and wherein:
according to the first rule, for every two consecutive transmissions of the at least four transmissions of the TB, receiving a first of the two consecutive transmissions by using a first TCI state of the two TCI states and receiving a second of the two consecutive transmissions by using a second TCI state of the two TCI states; and
according to the second rule, receiving every two consecutive transmissions of the at least four transmissions of the TB by using the first TCI state and the second TCI state alternatively.

9. The communications apparatus according to claim 6, wherein the programming instructions further instructing the communications apparatus to:
receive indication information indicating a redundancy version of the at least four transmissions and whether redundancy version of the at least four transmissions are same.

10. The communications apparatus according to claim 6, wherein same time-frequency resources in at least two slots are used for the at least four transmissions.

11. A communications method, comprising:
sending downlink control information (DCI) indicating two transmission configuration indicator (TCI) states to a terminal device;
enabling a rule for the terminal device for receiving at least four transmissions of a transport block (TB); and
sending the at least four transmissions of the TB for the terminal device to receive the at least four transmissions of the TB by using the two TCI states based on the rule.

12. The method according to claim 11, wherein the DCI includes TCI field indicating the two TCI states.

13. The method according to claim 11, wherein the rule is one of a first rule or a second rule, wherein:
according to the first rule, for every two consecutive transmissions of the at least four transmissions of the TB, receiving a first of the two consecutive transmissions by using a first TCI state of the two TCI states and receiving a second of the two consecutive transmissions by using a second TCI state of the two TCI states; and
according to the second rule, the terminal device receives every two consecutive transmissions of the at least four transmissions of the TB by using the first TCI state and the second TCI state alternatively.

14. The method according to claim 11, wherein same time-frequency resources in at least two slots are used for the at least four transmissions.

15. The method according to claim 11, further comprising:
sending indication information indicating a redundancy version of the at least four transmissions and whether redundancy version of the at least four transmissions are same to the terminal device.

16. A communications apparatus, comprising:
at least one processor communicably coupled to one or more memories storing programming instructions for execution by the at least one processor, the programming instructions instructing the communications apparatus to:
send downlink control information (DCI) indicating two transmission configuration indicator (TCI) states to a terminal device;
enable a rule for the terminal device for receiving at least four transmissions of a transport block (TB); and
send the at least four transmissions of the TB for the terminal device to receive the at least four transmissions of the TB by using the two TCI states based on the rule.

17. The communications apparatus according to claim 16, wherein the DCI includes TCI field indicating the two TCI states.

18. The communications apparatus according to claim 16, wherein the rule is one of a first rule or a second rule, wherein:
according to the first rule, for every two consecutive transmissions of the at least four transmissions of the TB, receiving a first of the two consecutive transmissions by using a first TCI state of the two TCI states and receiving a second of the two consecutive transmissions by using a second TCI state of the two TCI states; and
according to the second rule, the terminal device receives every two consecutive transmissions of the at least four transmissions of the TB by using the first TCI state and the second TCI state alternatively.

19. The communications apparatus according to claim 16, wherein same time-frequency resources in at least two slots are used for the at least four transmissions.

20. The communications apparatus according to claim 16, the programming instructions further instructing the communications apparatus to:
send indication information indicating a redundancy version of the at least four transmissions and whether redundancy version of the at least four transmissions are same to the terminal device.

* * * * *